(12) United States Patent
Johnson et al.

(10) Patent No.: US 11,312,289 B2
(45) Date of Patent: Apr. 26, 2022

(54) BED LIFT MOUNTING MEMBER

(71) Applicant: LIPPERT COMPONENTS, INC., Elkhart, IN (US)

(72) Inventors: Chad Johnson, Kaysville, UT (US); Andrew Murray, Granger, IN (US); Aaron Rasmussen, Fruit Heights, UT (US)

(73) Assignee: Lippert Components, Inc., Elkhart, IN (US)

( * ) Notice: Subject to any disclaimer, the term of this patent is extended or adjusted under 35 U.S.C. 154(b) by 0 days.

(21) Appl. No.: 16/921,634

(22) Filed: Jul. 6, 2020

(65) Prior Publication Data

US 2020/0331382 A1 Oct. 22, 2020

Related U.S. Application Data

(62) Division of application No. 15/601,418, filed on May 22, 2017, now Pat. No. 10,703,250, which is a division of application No. 14/714,215, filed on May 15, 2015, now Pat. No. 9,656,590.

(60) Provisional application No. 62/069,804, filed on Oct. 28, 2014, provisional application No. 61/993,962, filed on May 15, 2014.

(51) Int. Cl.
| | |
|---|---|
| *B60P 3/39* | (2006.01) |
| *A47C 17/80* | (2006.01) |
| *A47C 17/84* | (2006.01) |
| *B60R 11/00* | (2006.01) |

(52) U.S. Cl.
CPC ............... *B60P 3/39* (2013.01); *A47C 17/80* (2013.01); *A47C 17/84* (2013.01); *B60R 2011/0003* (2013.01); *B60R 2011/0049* (2013.01)

(58) Field of Classification Search
CPC ......... A47C 17/38; A47C 17/48; A47C 17/50; A47C 17/64; A47C 17/80; A47C 17/84; B60P 3/32; B60P 3/34; B60P 3/38; B60P 3/39
USPC ...................................... 296/24.33
See application file for complete search history.

(56) References Cited

U.S. PATENT DOCUMENTS

| | | | | |
|---|---|---|---|---|
| 6,163,900 A | * | 12/2000 | Stevenson ............... | A47C 17/80 5/118 |
| 2013/0081336 A1 | * | 4/2013 | Rasmussen ............. | B60R 11/00 52/29 |

OTHER PUBLICATIONS

Information about Related Patents, Patent Applications, and Patent Office Proceedings see the section below having the same title.
(Continued)

*Primary Examiner* — Jason S Daniels
(74) *Attorney, Agent, or Firm* — FisherBroyles, LLP

(57) ABSTRACT

A structure such as a recreational vehicle includes a guide member coupled to a wall of the structure, a carriage member slidingly coupled to the guide member, a mounting bracket coupled to the carriage member, and a bed coupled to the mounting bracket. The mounting bracket can be coupled to the carriage member in a readily releasable manner. The mounting bracket can also be slidably received by a bed support member that is coupled to or part of the bed.

20 Claims, 20 Drawing Sheets

(56) References Cited

OTHER PUBLICATIONS

Information Submitted in Parent Patent Applications, see MPEP 609.02 and the section below having the same title.
U.S. Appl. No. 15/601,418 U.S. Pat. No. 10,703,250, filed May 22, 2017, Lippert Components, Inc., Bed Lift Mounting Member.
U.S. Appl. No. 14/714,215 U.S. Pat. No. 9,656,590, filed May 15, 2015, Lippert Components, Inc., Bed Lift Mounting Member.

* cited by examiner

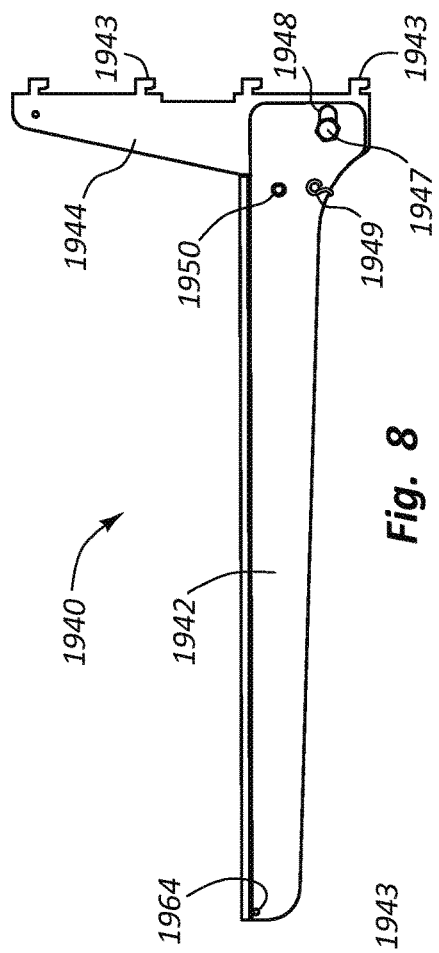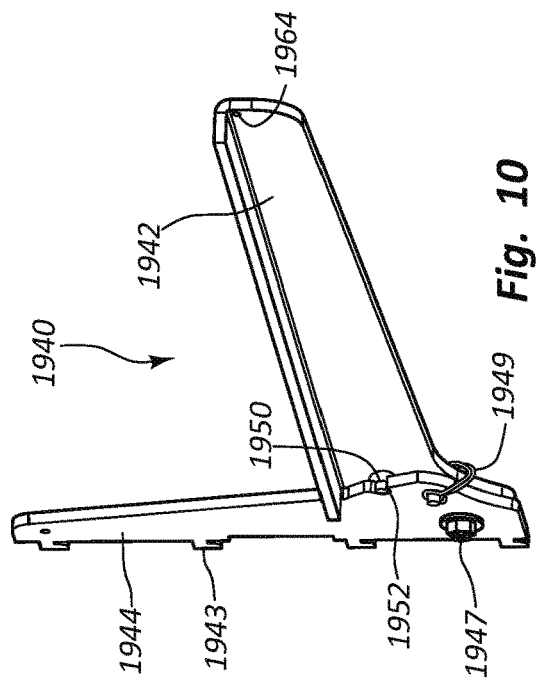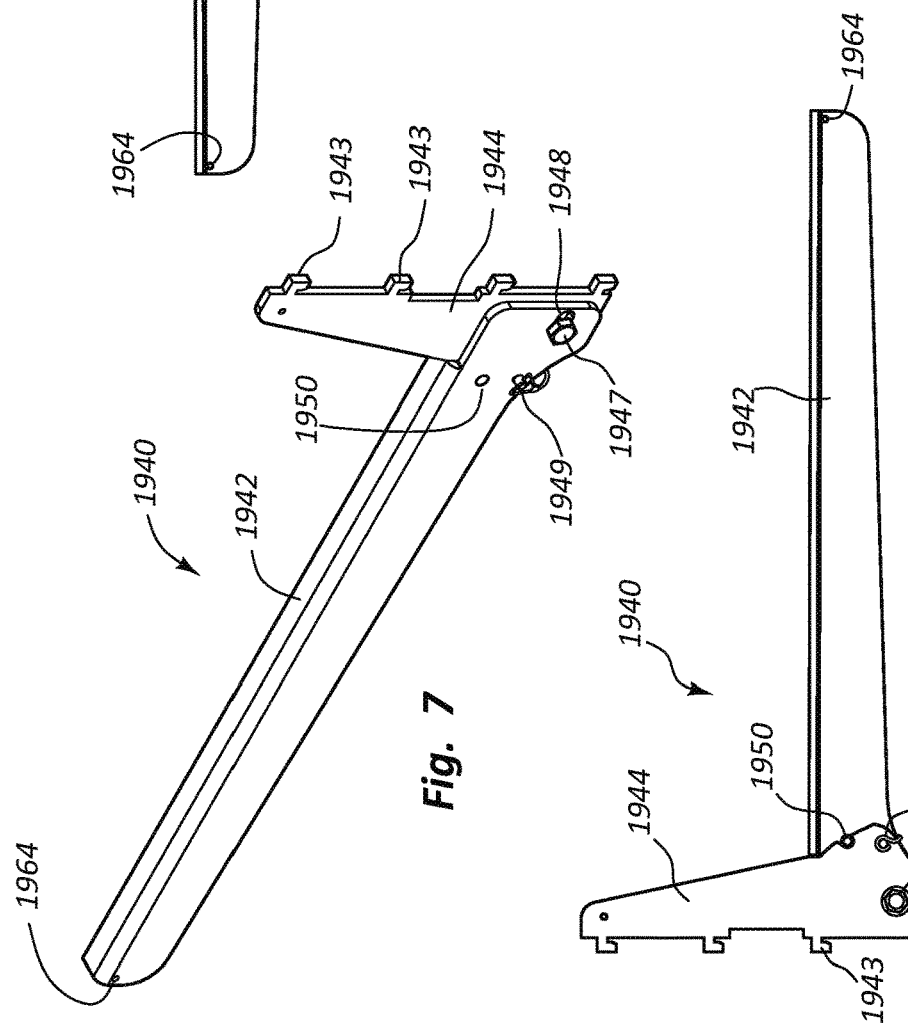

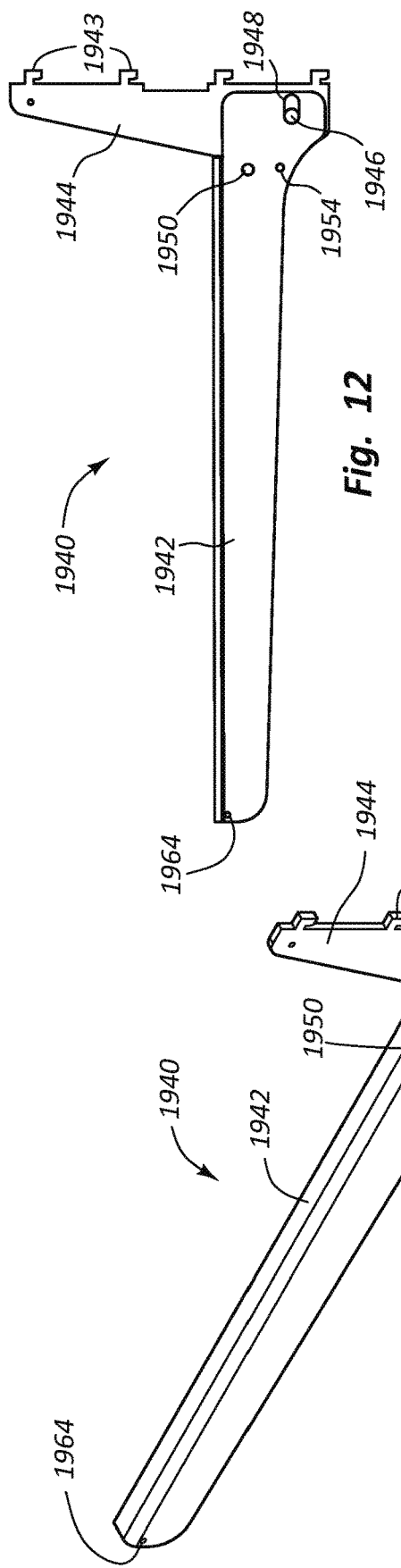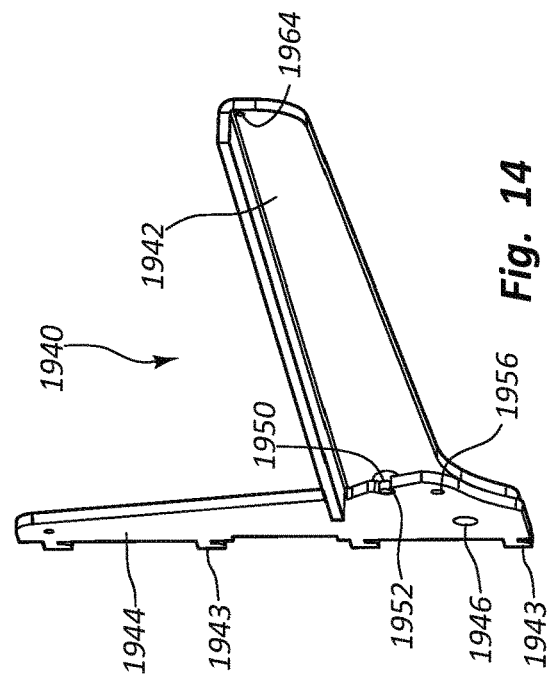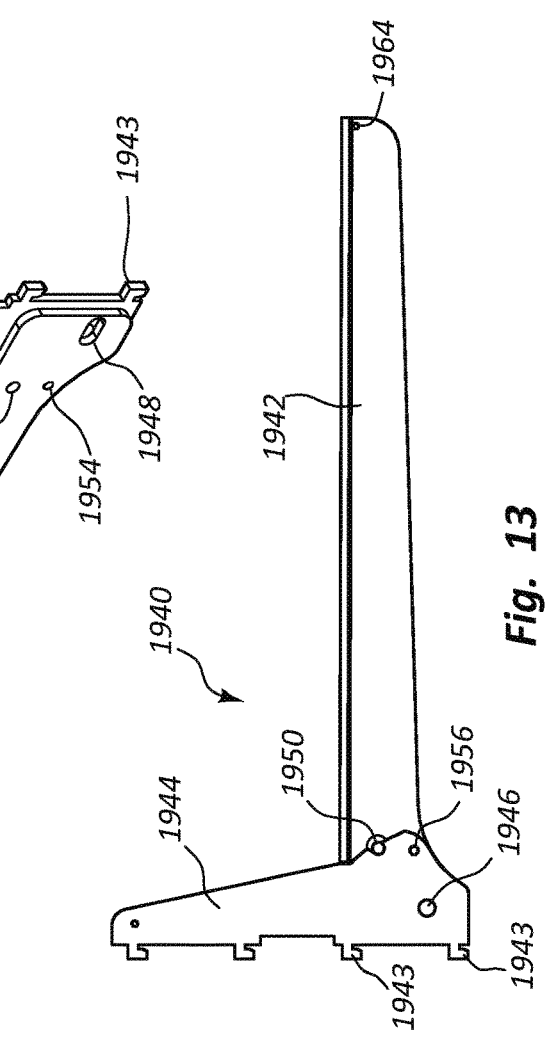

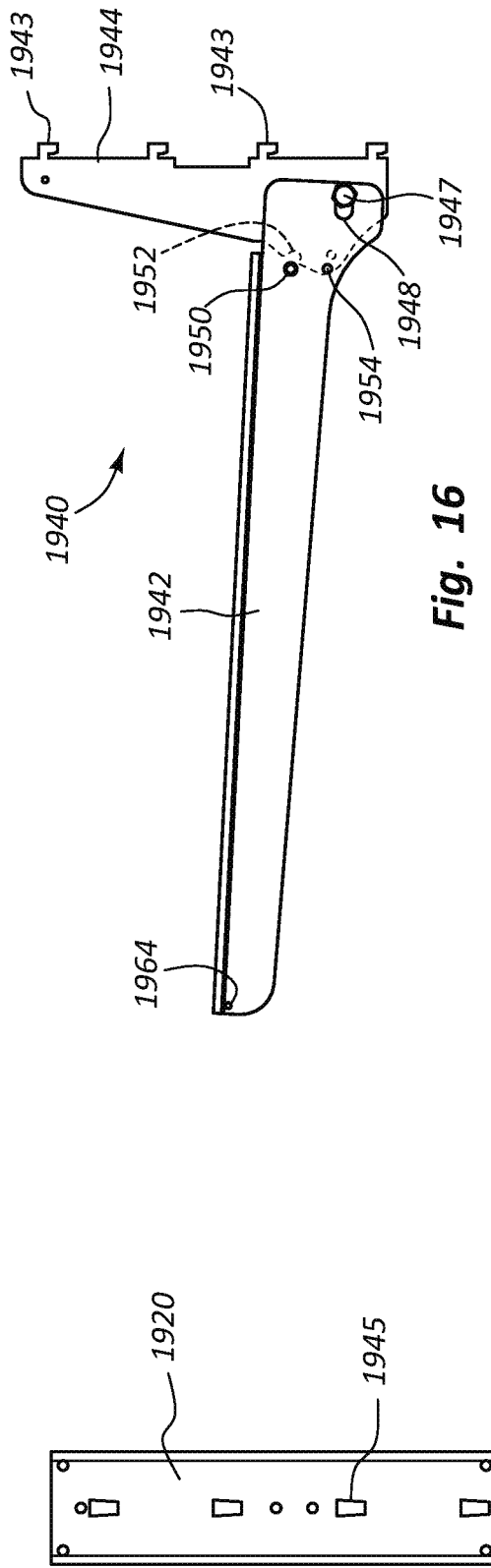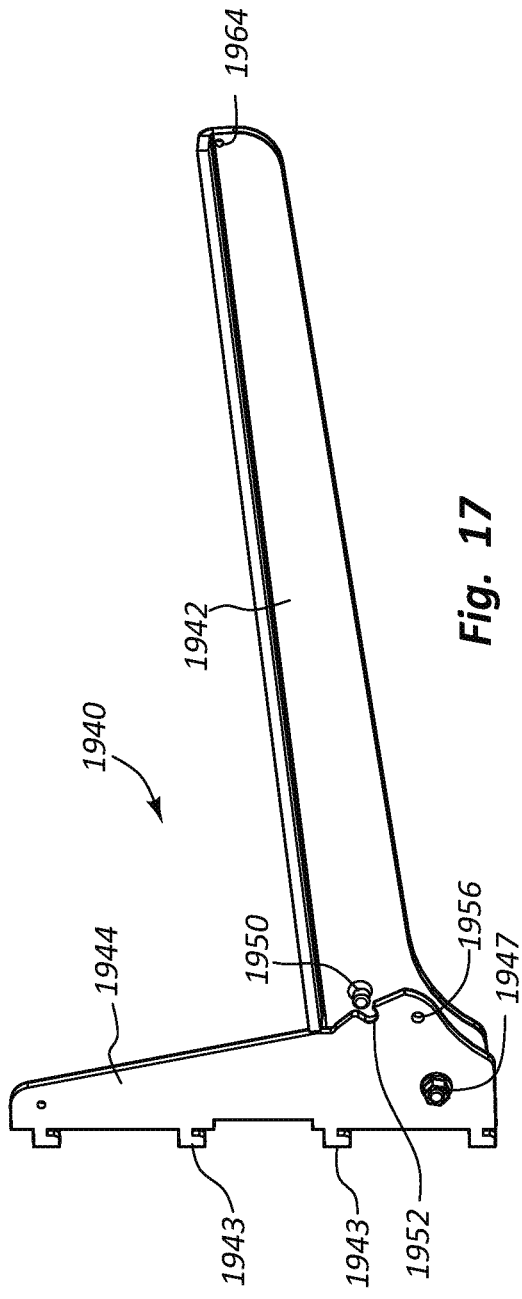

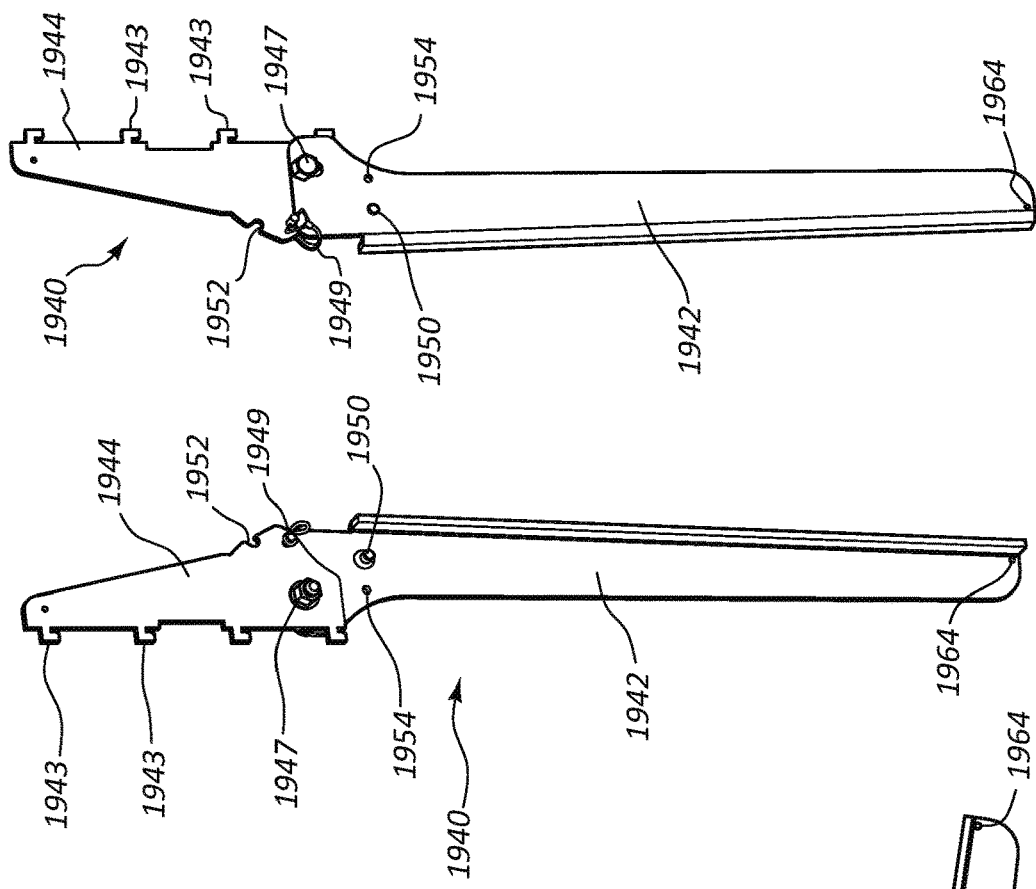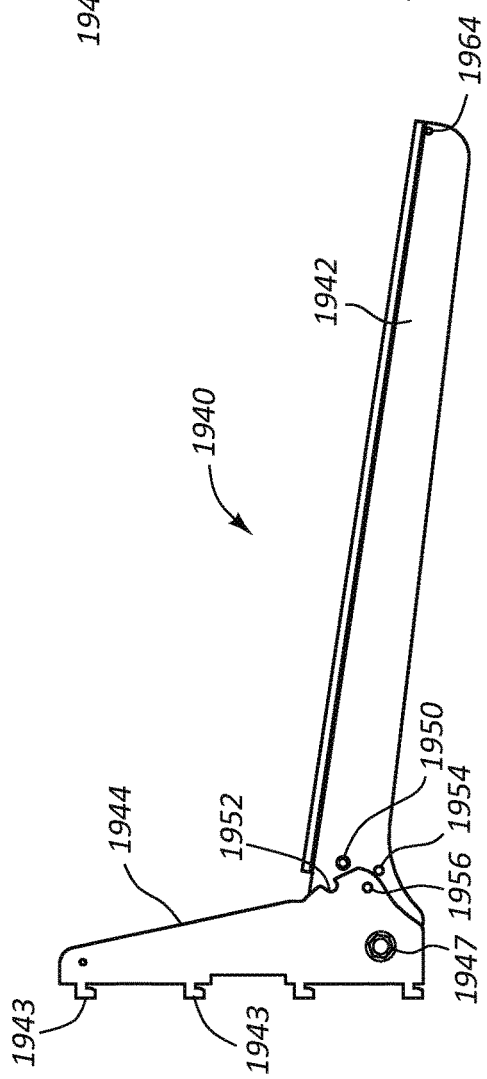

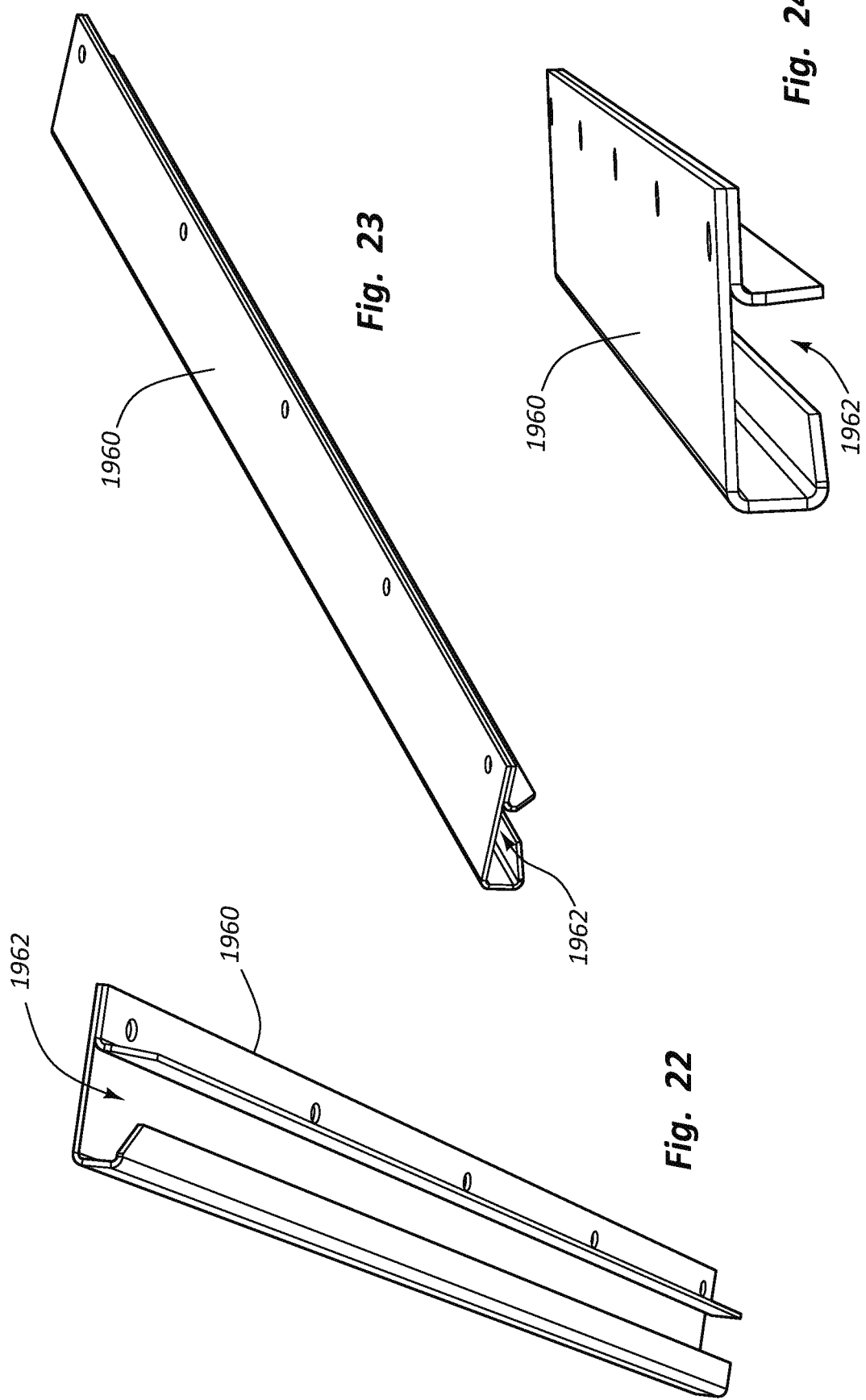

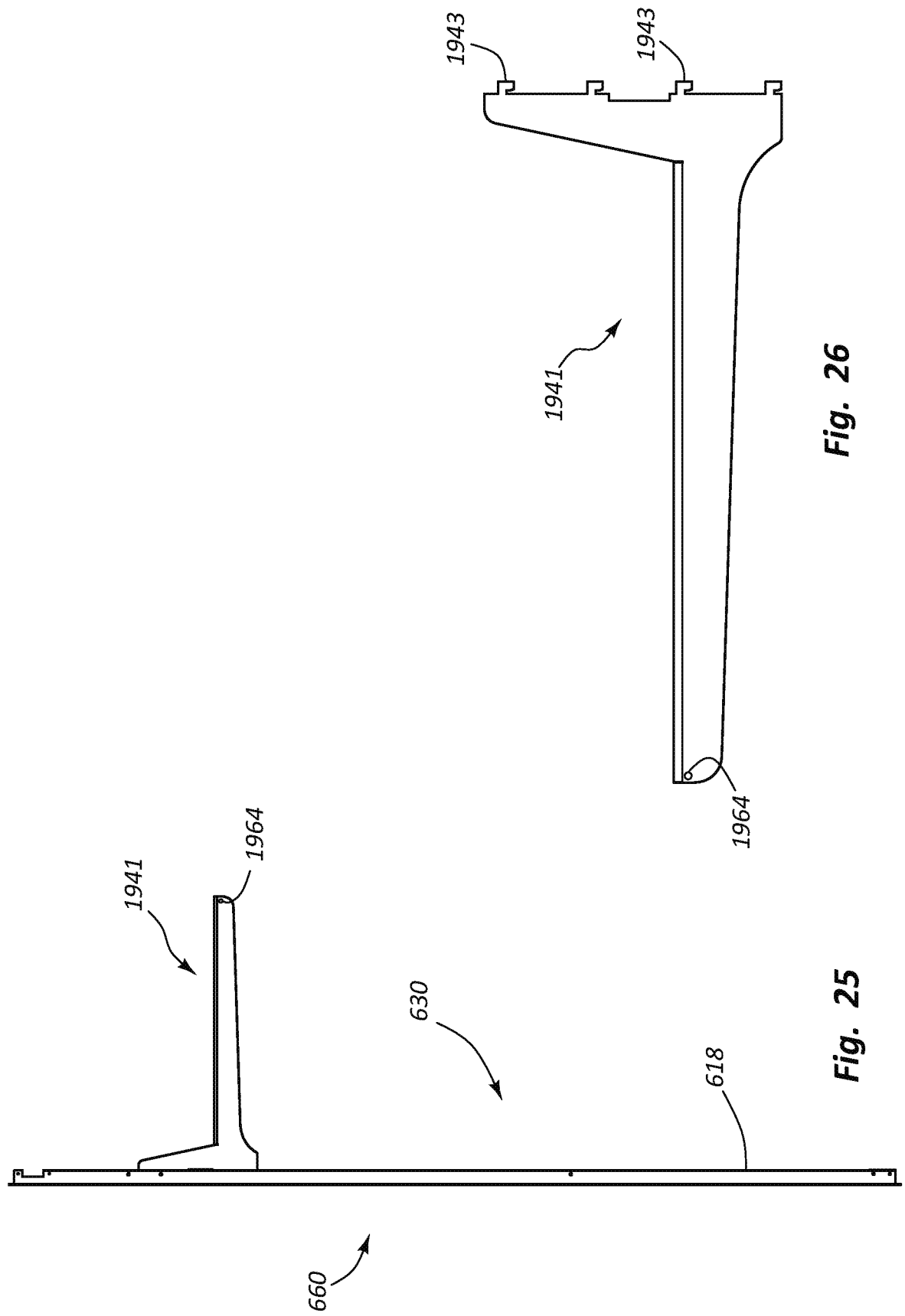

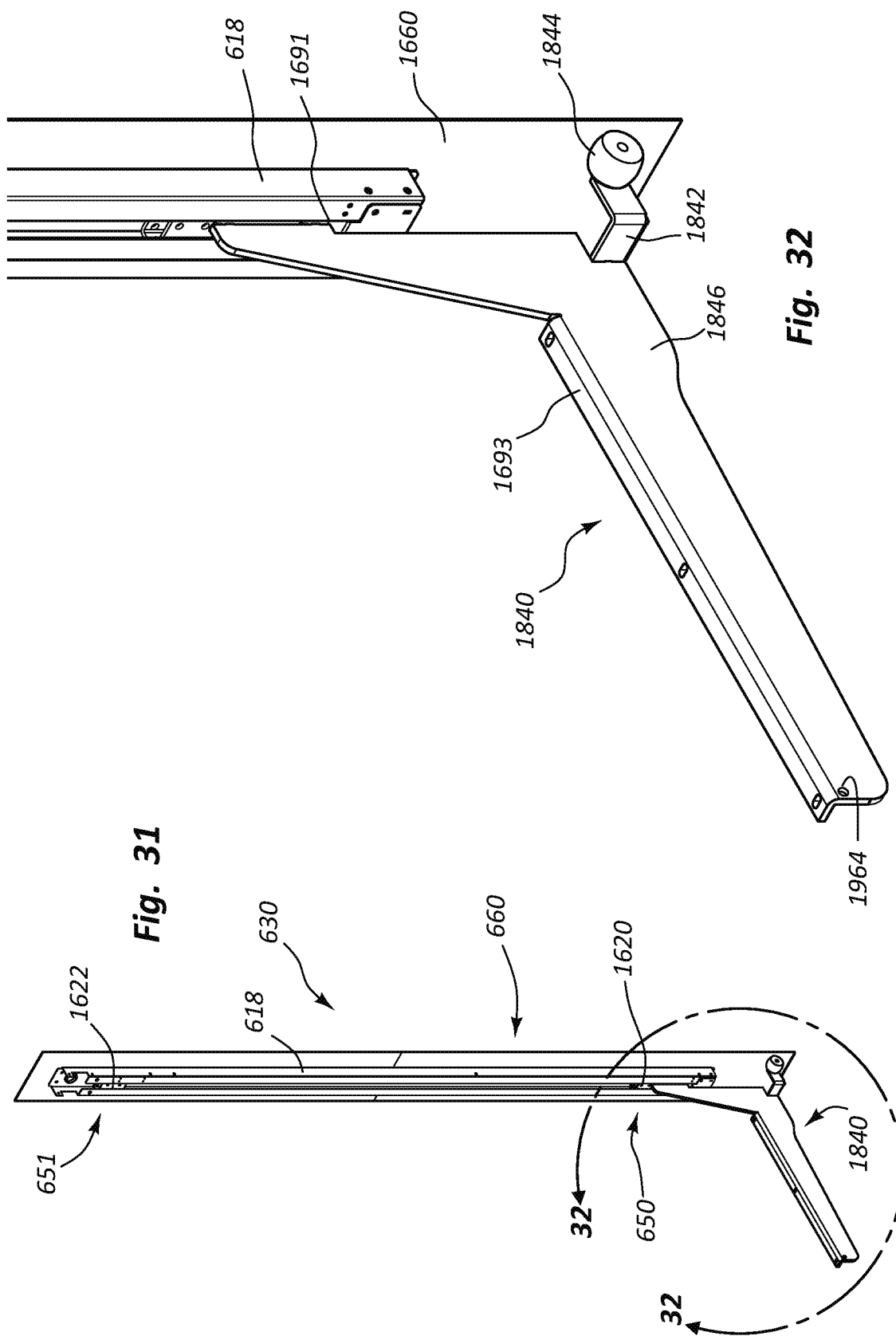

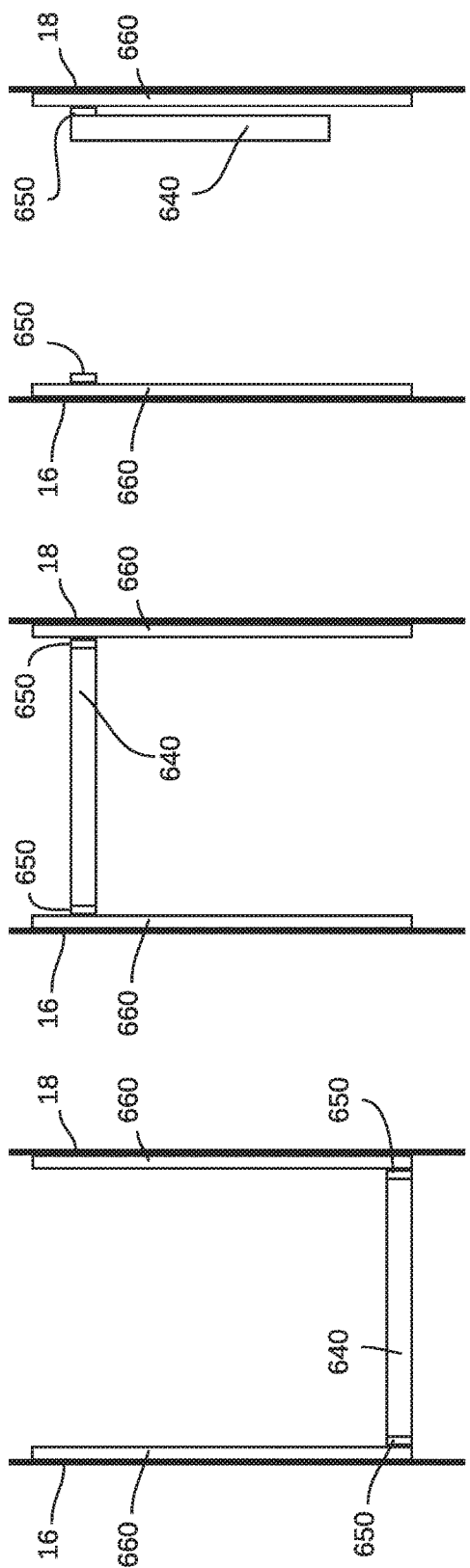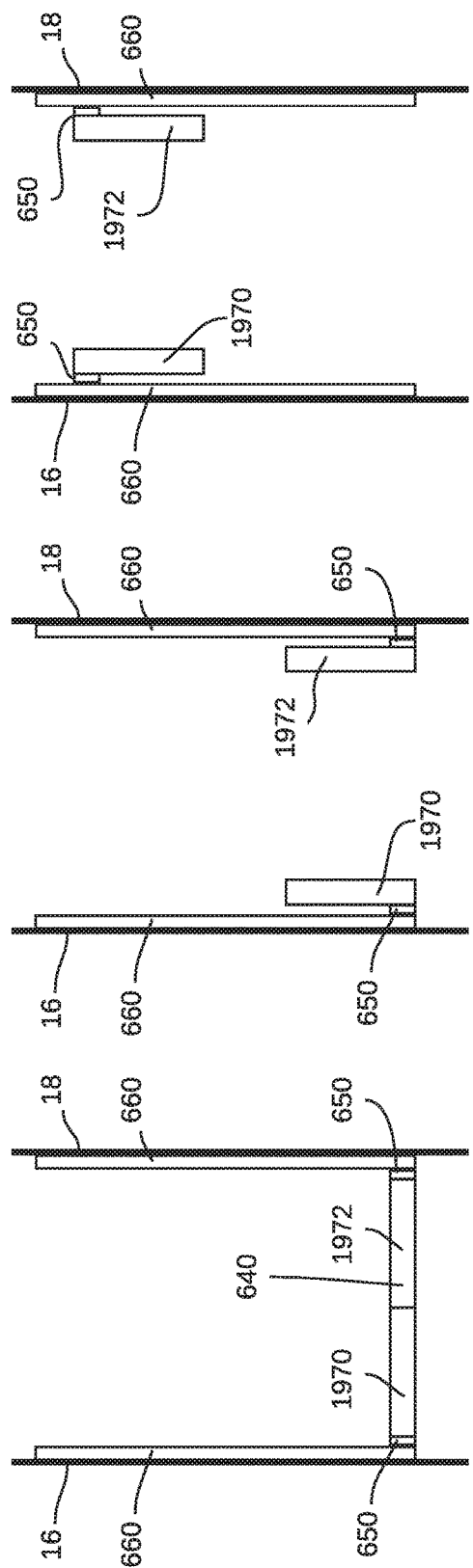

BED LIFT MOUNTING MEMBER

BACKGROUND

Shelter from the elements is a basic human need. Over the years, a number of structures have been developed to satisfy this need. For example, structures such as homes, apartments, condominiums, and the like have been used to effectively provide shelter from the elements. In addition to these immobile structures, mobile structures such as land vehicles, aircraft, watercraft, and the like have also been used to effectively shelter and/or transport people. Many of these structures are used not just to provide shelter but also to provide living quarters.

Ever since people began to use structures as living quarters, there has been an almost universal desire to increase the size and comfort provided by these structures. This is true regardless of whether the structure is mobile or immobile. For immobile structures, this desire is manifest by the continually increasing size of homes, apartments, condominiums, hotels, and the like. In the context of mobile structures, the desire for more space and comfort is manifest by the increased size of land vehicles, aircraft, watercraft, and the like.

The size of immobile structures is often limited by factors such as cost, available real estate in the area, government regulations, and the like. The size of mobile structures is often limited by transportation regulations set by the government (e.g., width of a road vehicle, length of a road vehicle, etc.) and by the physical dimensions of the roads (e.g., width of a travel lane, distance between railroad tracks, height of bridges, etc.) or other medium of transportation (e.g., waterways, etc.). Moreover, building larger structures unnecessarily increases the consumption of valuable resources (e.g., land, steel, wood, etc.). Accordingly, it would be desirable to more effectively utilize the space in structures without increasing the "footprint" of the structures.

One type of vehicle where it is especially desirable to maximize the utility of the interior space is a "toy hauler" type recreational vehicle. A toy hauler is a recreational vehicle having a cargo area used to receive and transport off-road vehicles. Bed lifts have been developed for the cargo area of toy haulers as shown in the '545 patent.

Certain off-road vehicles have trouble fitting under beds lifted by conventional bed lifts. This is especially a problem for side-by-side off-road vehicles such as the Polaris RZR and the like, which have high roll bars. Other off-road vehicles may not be able to fit inside the cargo area because the wheels of the off-road vehicles hit the bed lift components attached to the wall near the floor. The bed lift components can be raised relative to the floor but this also raises the bed making it difficult to get in and out of bed or sit on the bed when it is in a seating configuration.

SUMMARY

A number of representative embodiments are provided to illustrate the various features, characteristics, and advantages of the disclosed subject matter. The embodiments are described in the context of bed lift systems for toy haulers. It should be understood, however, that many of the concepts may be used in a variety of other settings, situations, and configurations. For example, the features, characteristics, advantages, etc., of one embodiment can be used alone or in various combinations and sub-combinations with one another.

A structure includes a bed that moves between a lowered position where the bed is positioned to receive one or more persons to sleep thereon and a raised position where the bed is stowed adjacent to the ceiling of the vehicle. In one embodiment, the structure is a vehicle such as a toy hauler recreational vehicle.

In one embodiment, the bed can move between the lowered position where the bed is oriented horizontally, the raised position where the bed is also oriented horizontally, and an upright position where at least a portion of the bed is oriented vertically and stowed adjacent to a wall of the structure. Moving the bed to the upright position increases the available height in the area where the bed is located. For example, a toy hauler can hold and transport a taller off-road vehicle in the cargo area when the bed is in the upright position.

In another embodiment, the bed can be configured to move between a sleeping configuration where the bed is flat and a seating configuration where the bed forms one or more seating units which each include a seat base and a seat back. The seating configuration can include at least two seating units facing each other and separated by an aisle. When the bed is in the upright position, the portion of the bed that forms one of the seating units is stowed vertically adjacent to one wall of the vehicle and the portion that forms another one of the seating units is stowed vertically adjacent to an opposite wall of the vehicle.

In another embodiment, the structure can also include a second bed positioned above the first bed. The second bed can move between a lowered position where it is positioned to receive one or more persons to sleep on it and a raised position where it is stowed adjacent to the ceiling of the structure.

In another embodiment, the structure includes a bed lift system inside the structure that moves the bed between the lowered position, the raised position, and the upright position. The bed lift system can include a mounting member coupled to the bed. The mounting member can move between a first position where the bed is oriented horizontally and a second position where the bed is oriented vertically. This allows the bed to rotate between being horizontal and being vertical.

In another embodiment, the mounting member can include a support base coupled to the other components of the bed lift system and a support arm coupled to the bed. The support arm rotates relative to the support base to move the mounting member between the first position and the second position.

In another embodiment, the bed lift system can comprise a lifting assembly including a guide member coupled to the vehicle, a moving member coupled to the guide member in a manner that allows the moving member to move vertically relative to the guide member, and a mounting member coupled to the moving member. The mounting member can support the bed at a location that is: (a) below the lowest point where the mounting member is coupled to the moving member or (b) below the bottom of the guide member.

In another embodiment, the bed lift system includes a mounting member that is supported against the wall of the structure. For example, the mounting member can include an upper portion where the mounting member is coupled to the other components of the bed lift system and a lower portion that bears against the wall. The lower portion of the mounting member is supported by the wall so that it can't rotate towards the wall when weight is put on the bed. However, the mounting member can extend below the other components of the bed lift system This allows the wall-mounted components of the bed lift system to be positioned higher on the wall so that they do not interfere with things like the tires of the off-road vehicles. The mounting member is vertically offset so that it can extend below the other components when the bed is in the lowered position so that the bed is at the desired height.

The Summary is provided to introduce a selection of concepts in a simplified form that are further described below in the Detailed Description. The Summary and the Background are not intended to identify key concepts or essential aspects of the disclosed subject matter, nor should they be used to constrict or limit the scope of the claims. For example, the scope of the claims should not be limited based on whether the recited subject matter includes any or all aspects noted in the Summary and/or addresses any of the issues described in the Background.

DRAWINGS

The preferred and other embodiments are disclosed in association with the accompanying drawings in which.

FIGS. 7-10 are perspective views of one embodiment of a mounting member used to support the beds and/or couple them to a bed lift system. The mounting member moves between a first position that corresponds to the bed being oriented horizontally and a second position that corresponds to the bed being oriented vertically. The mounting member is shown in the first position.

FIGS. 11-14 are perspective views of the mounting member in FIGS. 7-10 with the fasteners removed to show the fastening holes.

FIG. 15 is one embodiment of a moving member configured to be coupled to the mounting member in FIGS. 7-14. The moving member is part of the bed lift system and is used to vertically move the beds.

FIGS. 16-17 are perspective views of the mounting member in FIGS. 7-14 with the support arm disengaged from the support base so that the support arm can rotate relative to the support base.

FIG. 18 is a perspective view of the mounting member in FIGS. 7-14 as it rotates from the first position to the second position.

FIGS. 19-20 are perspective views of the mounting member in FIGS. 7-14 locked in the second position.

Figure 21:
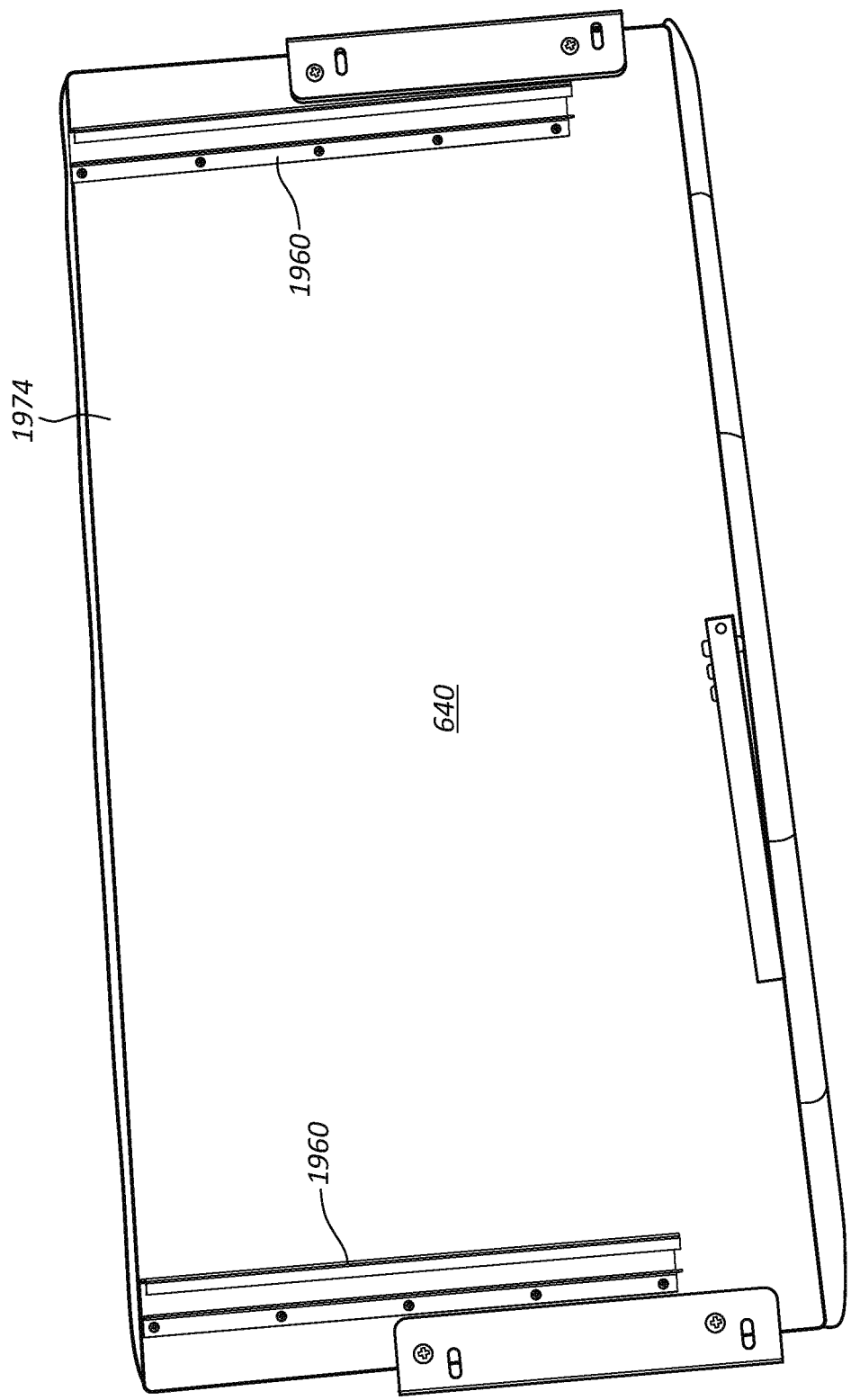

FIG. 21 is a perspective view of the underside of one of the beds in FIGS. 1-6 coupled to a bed support member configured to be coupled to the mounting member in FIGS. 7-14.

FIGS. 22-24 are perspective views of the bed support member shown in FIG. 21.

FIGS. 25-26 are side views of another embodiment of the mounting member that is stationary and does not rotate.

FIGS. 27-30 are perspective views of the interior of the toy hauler in FIG. 1 having another embodiment of the bed lift system where the guide members are raised relative to the floor and the mounting member is configured to vertically offset the bed below the bottom of the bed lift system. The position of the beds in FIGS. 27-30 corresponds to the position of the beds in FIGS. 2-3 and 5-6, respectively.

FIG. 31 is a perspective view of one embodiment of the lifting assembly from the bed lift system in FIGS. 27-30 showing how the mounting member is vertically offset downward and supported by wheels that roll against the wall adjacent to the lifting assembly.

FIG. 32 is a blown-up perspective view of the mounting member in FIG. 31.

Figure 33:
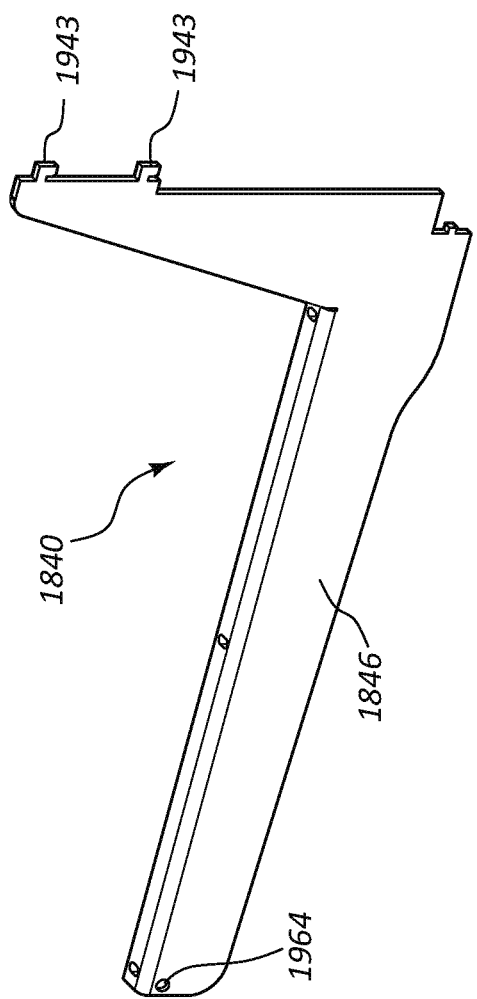

FIG. 33 is a perspective view of one embodiment of a main mounting bracket from the mounting member in FIGS. 31-32.

Figure 34:
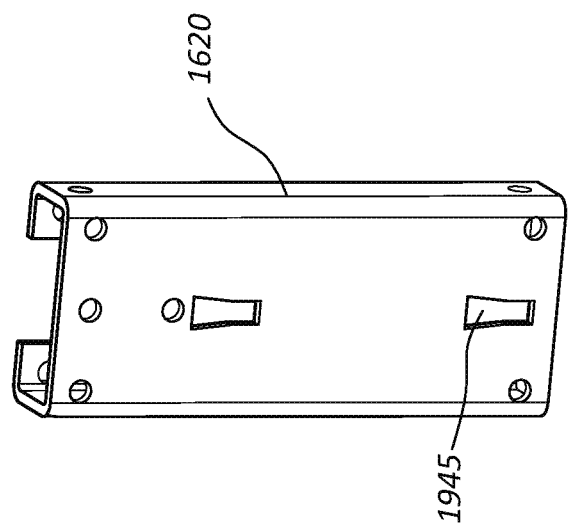

FIG. 34 is a perspective view of one embodiment of a moving member used with the mounting member in FIGS. 31-32.

Figure 35:
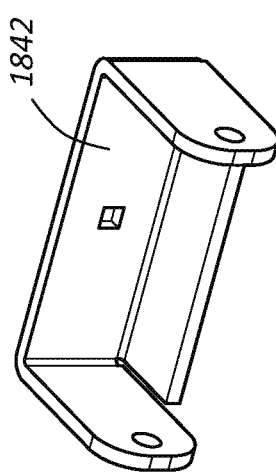

FIG. 35 is a perspective view of one embodiment of a support bracket from the mounting member in FIGS. 31-32.

FIGS. 36-38 show the lower bed as a single unitary component that rotates to a vertical orientation adjacent to one of the walls of the toy hauler.

FIGS. 39-41 show the lower bed divided into two portions (FIG. 39) where the portions rotate upward from the lowered position to the upright position (FIG. 40) or rotate downward from the raised position to the upright position (FIG. 41).

DETAILED DESCRIPTION

Figure 1:
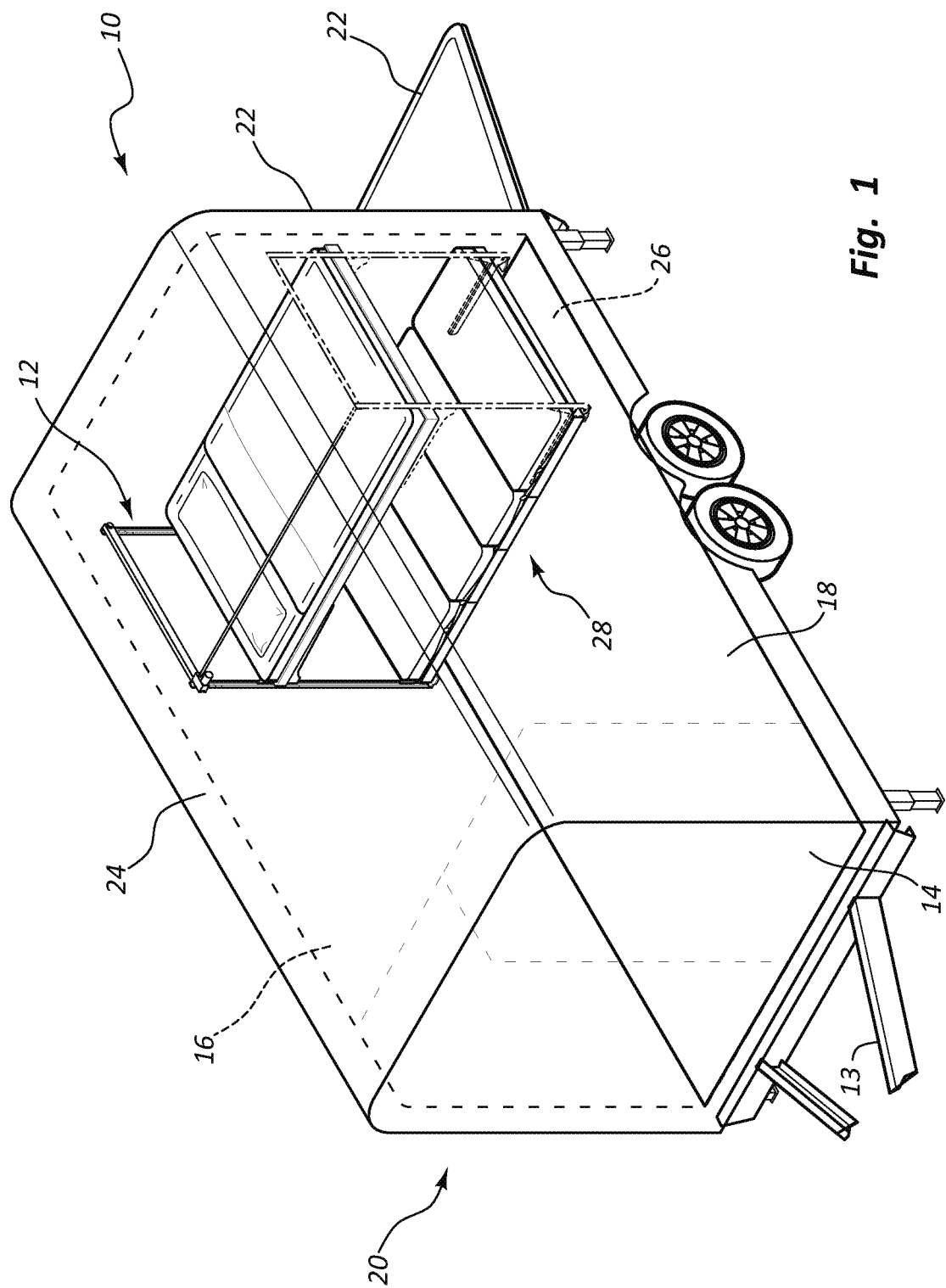
FIG. 1 is a perspective view of one embodiment of a toy hauler recreational vehicle with bunk beds positioned in the cargo area.
Figure 2:
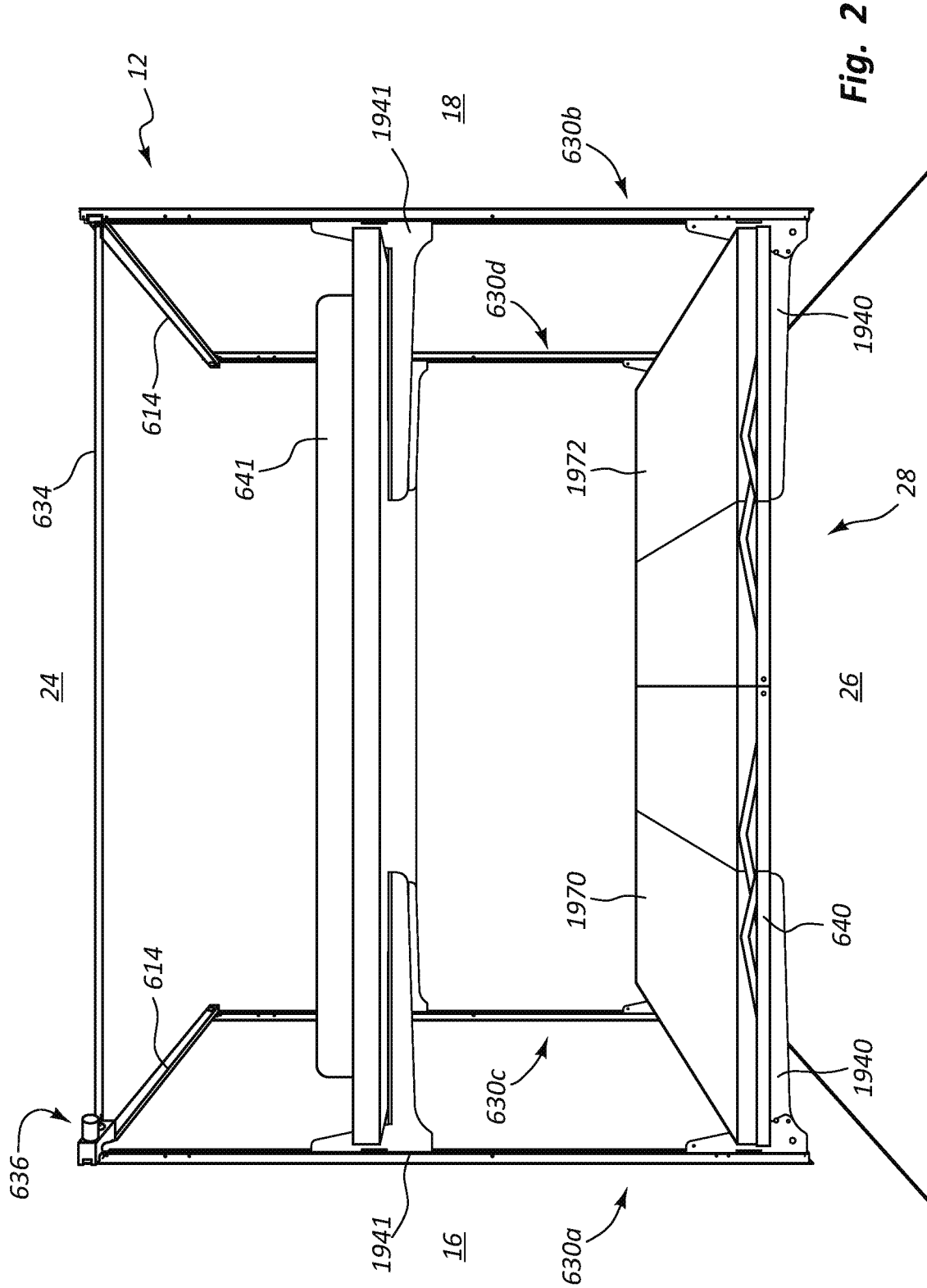
FIG. 2 is a perspective view of the interior of the toy hauler in FIG. 1 with the bunk beds in a lowered position where the beds are oriented horizontally and positioned to receive one or more persons to sleep thereon.

Referring to FIG. 1, a structure which, in this embodiment, is a "toy hauler" type of recreational vehicle 10 includes a bed lift system 12 for vertically moving one or more beds 640, 641. The vehicle 10 includes a vehicle body 20 which is coupled to a frame 13. The body 20 includes a front wall 14, a first side wall 16, a second side wall 18 positioned opposite the first wall 16, a rear wall 22, a ceiling 24, and a floor 26.

The vehicle 10 also includes a cargo area 28 which is used to receive and/or transport off-road vehicles (e.g., side-by-side ATVs, four-wheelers, motorcycles, snowmobiles, dune buggies, personal watercraft, and the like) and/or other vehicles (e.g., cars, JEEP type vehicles, and so forth) to various destinations where they may be used in recreational activities. In the embodiment shown in FIG. 1, the rear wall 22 is used as both a door to enter the vehicle 10 and as a ramp to move an off-road vehicle into and/or out of the cargo area 28.

It should be appreciated that much of the subject matter disclosed in this document is the same or similar to the subject matter disclosed in the '545 patent. Therefore, the descriptions and other disclosures related to such subject matter in the '545 patent, which is incorporated by reference into this document in its entirety, apply equally to the same or similar subject matter in this document. A brief description of such subject matter is provided in this document for context but the '545 patent should be consulted for a complete, detailed description.

It should also be appreciated that any of the new subject matter disclosed in this document can be used with any of the embodiments disclosed in the '545 patent. For example, the beds 640, 641 can move in the manners disclosed in this document using any of the lift systems in the '545 patent. Also, any of the mounting members disclosed in this document can be used with any of the embodiments in the '545 patent. The number of embodiments that can be created by the various combinations is virtually limitless.

The bed lift system 12 includes lifting assemblies 630a, 630b, 630c, 630d (collectively or generically referred to as "lifting assemblies 630"), a drive member 634, cross members 614, and a motor assembly 636. The lifting assemblies 630a, 630c are coupled to the first side wall 16, and the lifting assemblies 630b, 630d are coupled to the second side wall 18.

A cross member 614 is coupled between the lifting assemblies 630a, 630c and the lifting assemblies 630b, 630d. The cross members 614 conceal a flexible drive member that synchronizes movement of the adjacent lifting assemblies 630a, 630c and 630b, 630d. The drive member 634 synchronizes movement of the pair of lifting assemblies 630a, 630c coupled to the first side wall 16 and the pair of lifting assemblies 630b, 630d coupled to the second side wall 18. The motor assembly 636 drives movement of the lifting assemblies 630.

Figure 3:
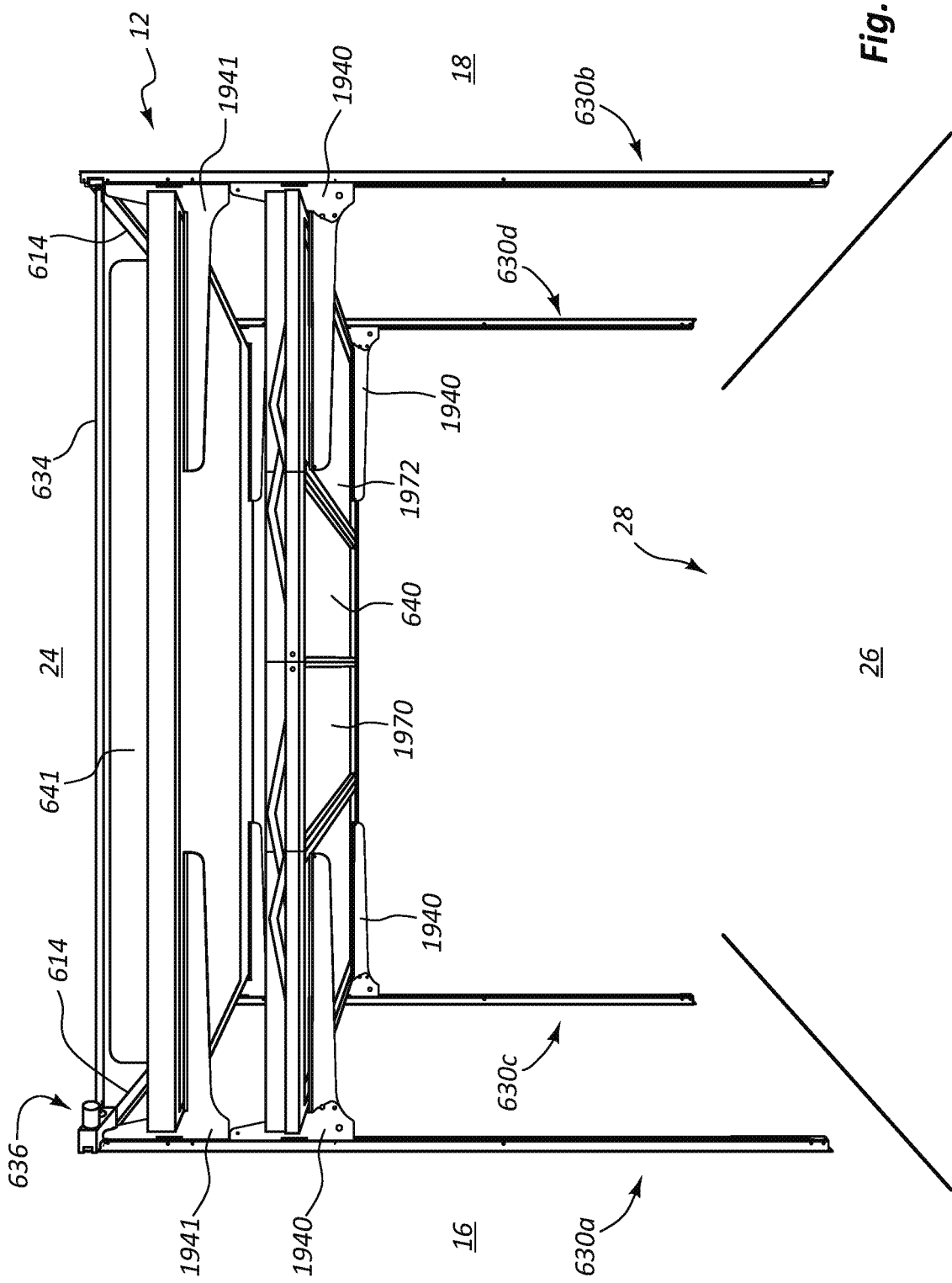
FIG. 3 is a perspective view of the interior of the toy hauler in FIG. 1 with the bunk beds in a raised position where the beds are oriented horizontally and stowed adjacent to the ceiling of the vehicle.
Figure 27:
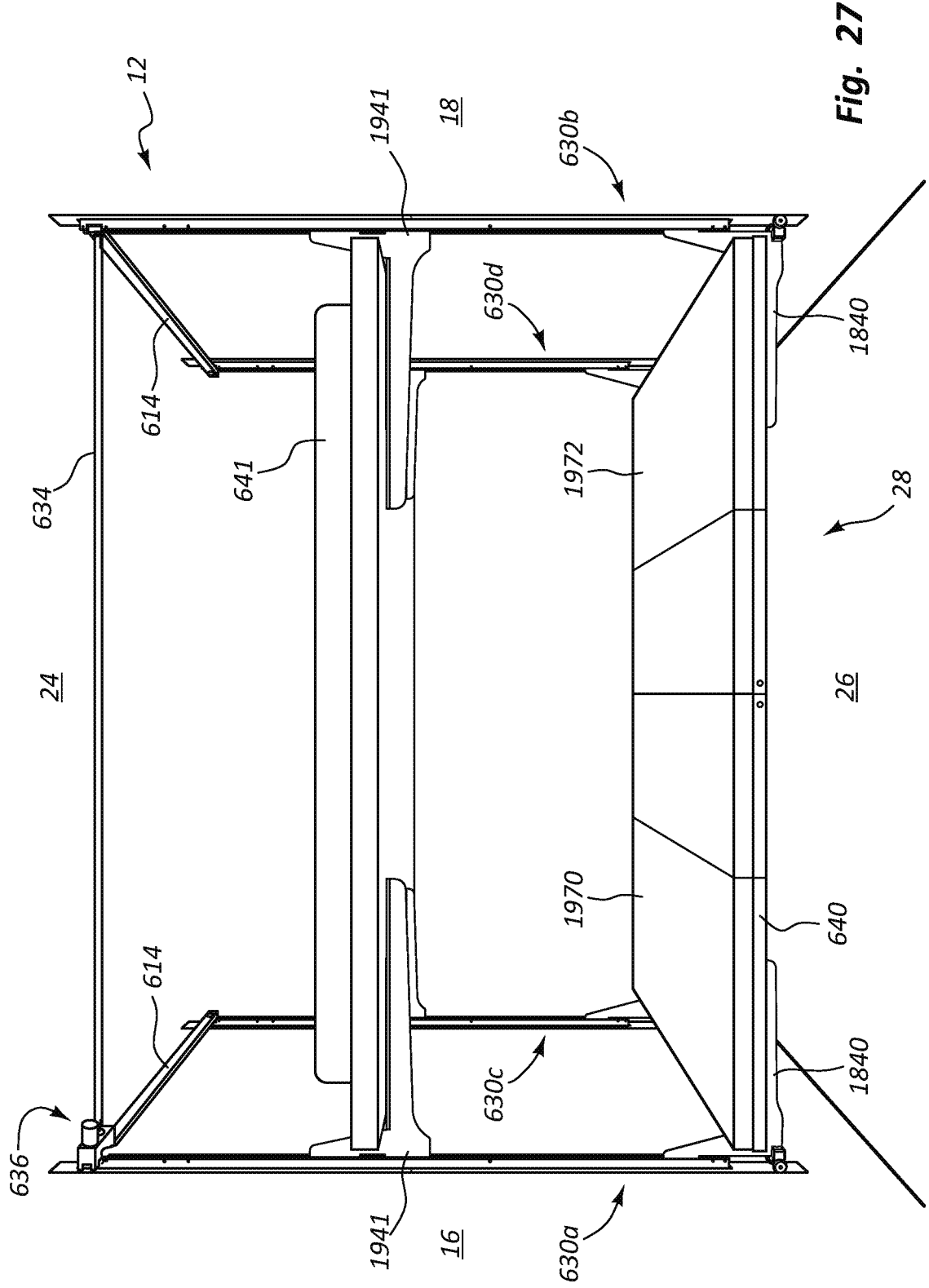
Figure 28:
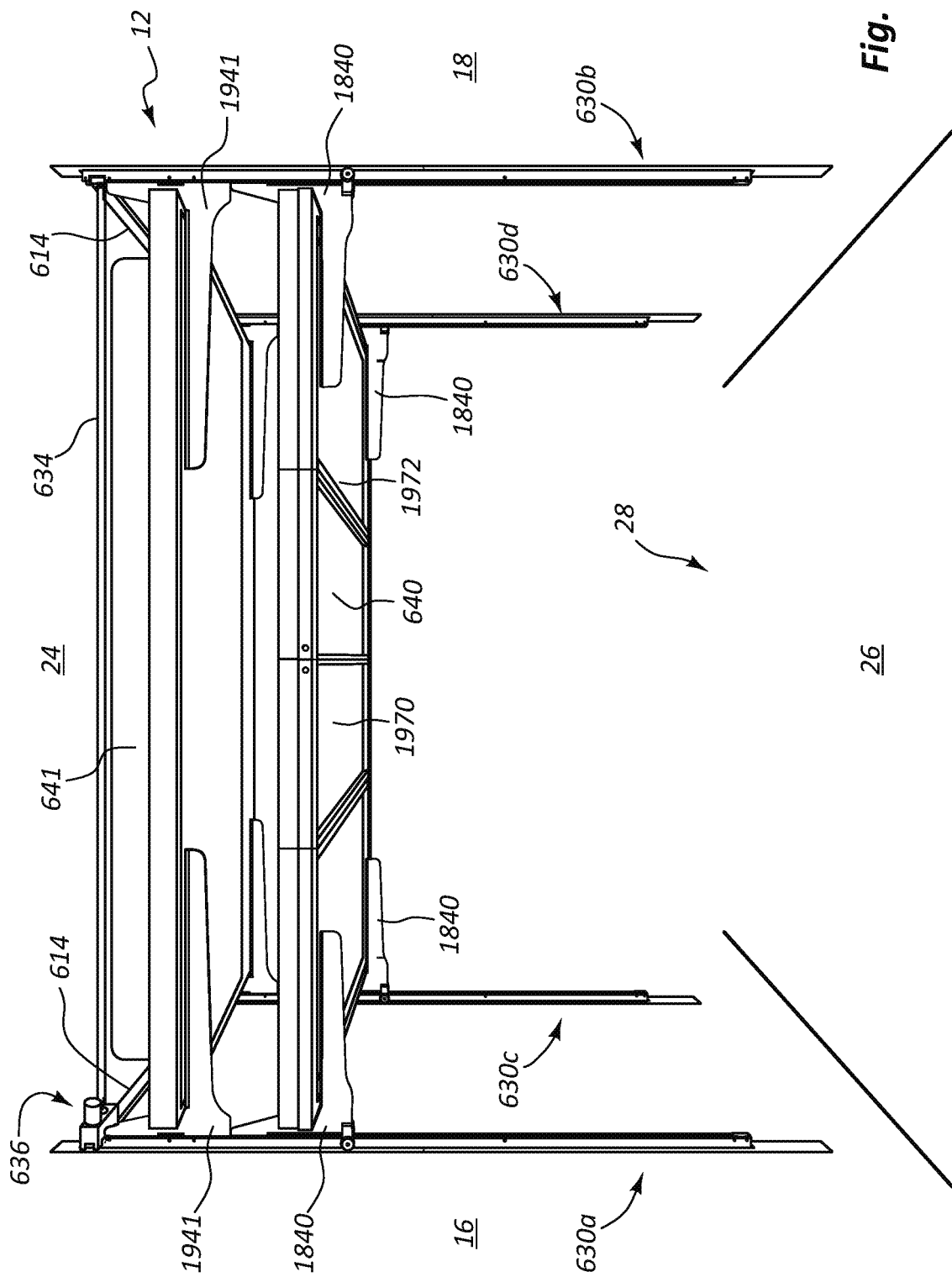
Figure 29:
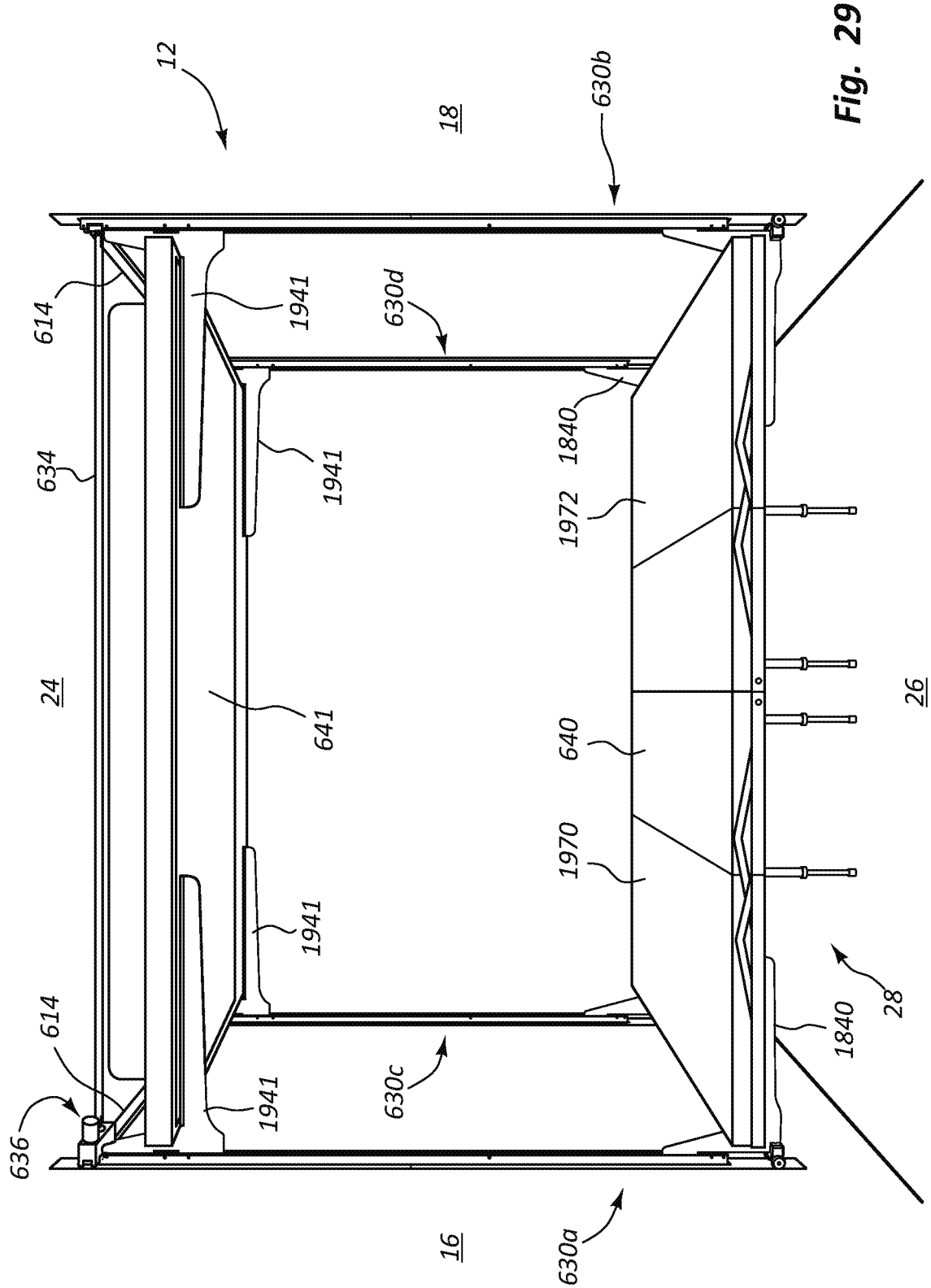
Figure 30:
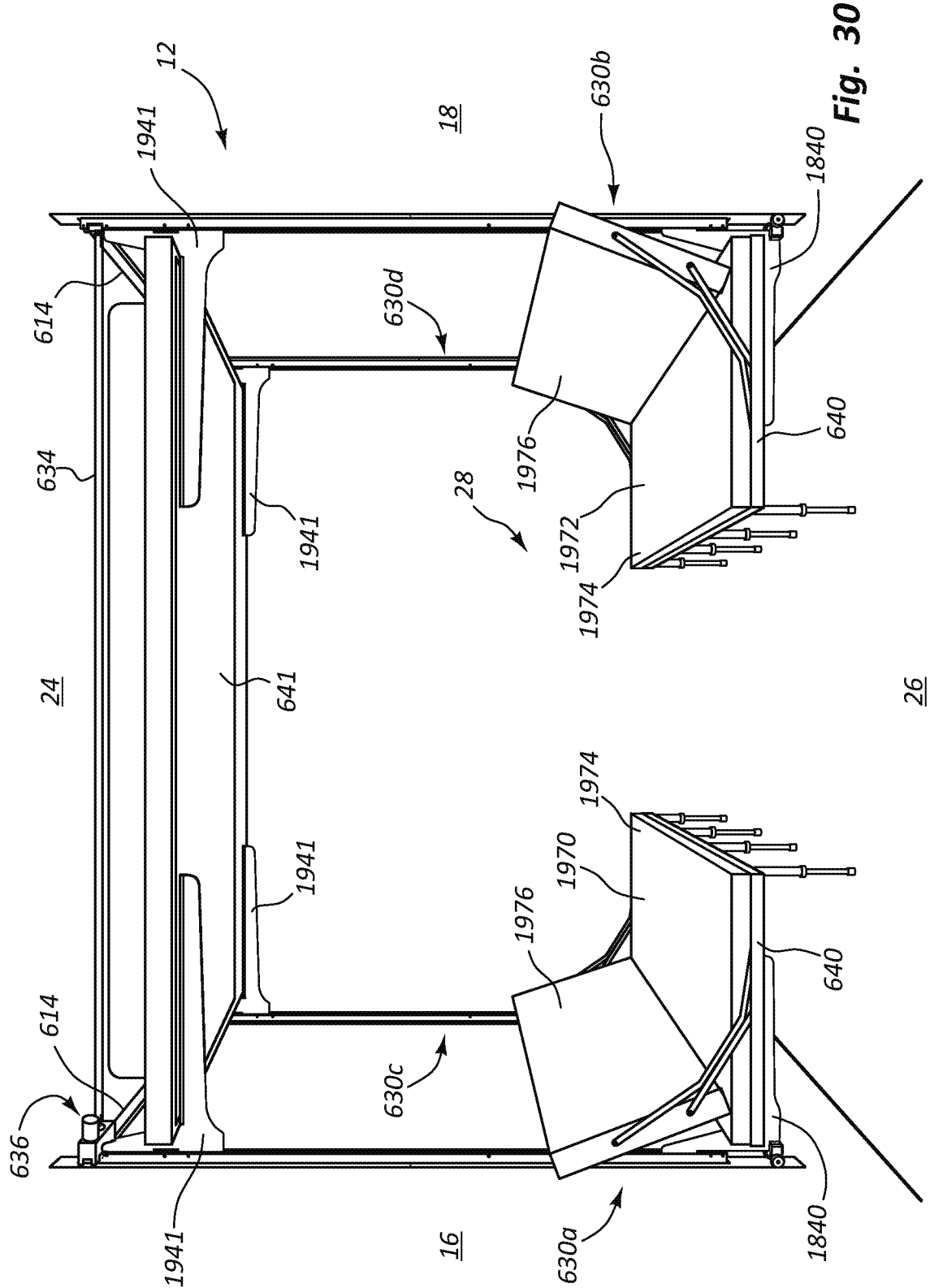

The lifting assemblies 630 vertically move a first or lower bed 640 and a second or upper bed 641 between a lowered position the beds 640, 641 are oriented horizontally and positioned to receive one or more persons to sleep thereon (FIGS. 2 and 27) and a raised position where the beds 640, 641 are oriented horizontally and stowed adjacent to the ceiling 24 of the vehicle 10 (FIGS. 3 and 28). It should be appreciated that although two beds 640, 641 are shown in the Figs., the lifting assemblies 630 can lift one bed 640 or more than two beds.

In one embodiment, the lifting assemblies 630 can reciprocally and at least translationally move the beds 640, 641 between the lowered position and the raised position. Translational movement refers to motion of a body where every point of the body moves parallel to and the same distance as every other point of the body.

Referring to FIG. 31, each lifting assembly 630 includes a lower moving assembly 650, an upper moving assembly 651, and a guide assembly 660. The moving assembly 650 is coupled to the lower bed 640 and the moving assembly 651 is coupled to the upper bed 641. The moving assemblies 650, 651 cooperate with the guide assembly 660 to vertically move the beds 640, 641 between the lowered position and the raised position. In one embodiment, the moving assemblies 650, 651 slidably cooperate with the guide assembly 660 to vertically move the beds 640, 641.

The moving assemblies 650, 651 each include a moving member or carriage member 1920, 1620, 1622 and a mounting member 1940, 1840, 1941 coupled to the moving member 1920, 1620, 1622. The mounting member can alternatively be referred to as a bracket, mounting bracket, mounting device, mounting mechanism, or mounting assembly. It should be appreciated that the moving assemblies 650, 651 can include any embodiment of the moving member 1920, 1620, 1622 and any embodiment of the mounting member 1940, 1840, 1941.

It should also be appreciated that the moving assemblies 650, 651 can include any of the embodiments of the moving member and/or mounting member disclosed in the '545 patent. For example, the moving assemblies 650, 651 can include the moving members 620, 622 and the mounting member 840 disclosed in the '545 patent.

The guide assembly 660 includes a guide member or guide rail 618 coupled to one of the walls 16, 18 of the vehicle 10 in a vertical orientation. The moving members 1920, 1620, 1622 are coupled to the guide member 618 in a manner that allows them to move vertically relative to the guide member 618. In one embodiment, the guide member 618 defines a channel sized to slidably receive the moving members 1920, 1620, 1622. For example, the guide member 618 can have a C-shaped cross section that forms the channel and slidably receives the moving members 1920, 1620.

The moving assemblies 650, 651 support the beds 640, 641, respectively, as the beds 640, 641 move vertically. The mounting members 1940, 1840, 1941 are coupled to beds 640, 641. The mounting members 1940, 1840, 1941 are, in turn, coupled to the moving members 1920, 1620, 1622.

Referring to FIGS. 2-6, the lower bed 640 is coupled to the lifting assemblies 630 by the moving member 1920 and the mounting member 1940. The upper bed 641 is coupled to the lifting assemblies 630 by the moving member 1920 and the mounting member 1941. The main difference between the mounting members 1940, 1941 is that the mounting member 1940 moves between a first position where the bed is oriented horizontally and a second position where the bed is oriented vertically and the mounting member 1941 is stationary.

FIGS. 2-6 illustrate the different bed/couch configurations that can be achieved using the bed lift system 12. The beds 640, 641 can move between a lowered position where the beds 640, 641 are oriented horizontally and positioned to receive one or more persons to sleep thereon (FIG. 2) and a raised position where the beds 640, 641 are oriented horizontally and stowed adjacent to the ceiling 24 of the vehicle 10 (FIG. 3).

Figure 4:
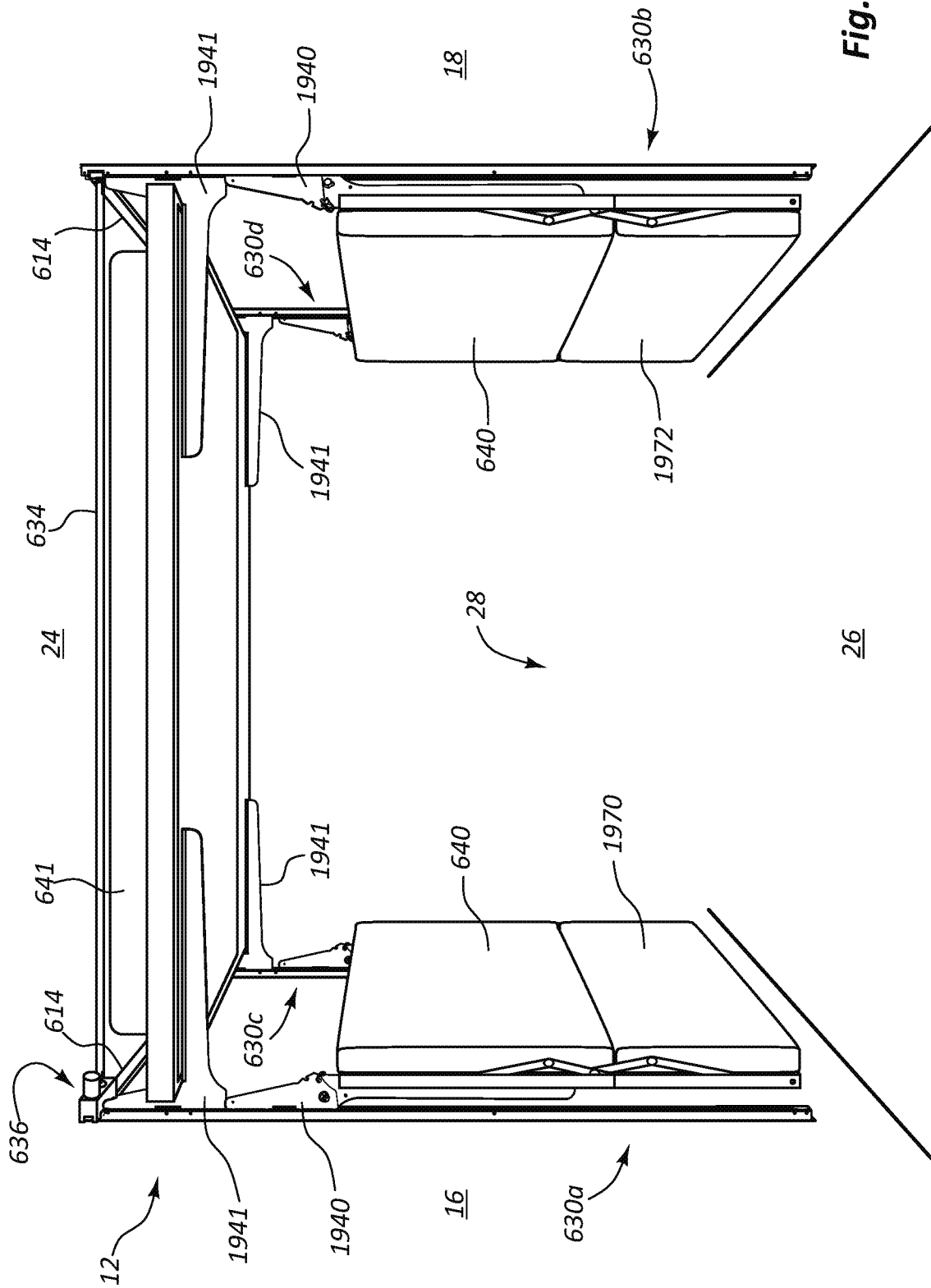
FIG. 4 is a perspective view of the interior of the toy hauler in FIG. 1 with the bunk beds in a partially stowed position where the lower bed is an upright position so that at least a portion of the lower bed is oriented vertically and stowed adjacent to the walls of the vehicle and the upper bed is oriented horizontally and stowed adjacent to the ceiling of the vehicle.

The beds 640, 641 can also move between the lowered position, the raised position, and an upright position where at least a portion of the lower bed 640 is oriented vertically and stowed adjacent to the walls 16, 18 of the vehicle 10 (FIG. 4). The upright position is particularly useful when it is desirable to provide additional overhead clearance inside the vehicle 10 to accommodate tall off-road vehicles and the like.

In the embodiment shown in FIG. 4, the lower bed 640 is divided roughly down the middle into a first portion 1970 and a second portion 1972. The portions 1970, 1972 of the lower bed 640 rotate downward from the raised position to the upright position (FIGS. 4, 39, and 41) where the portions 1970, 1972 are oriented vertically and stowed adjacent to the walls 16, 18, respectively, of the vehicle 10. In an alternative embodiment, the portions 1970, 1972 can rotate upward from the lowered position to the upright position (FIGS. 39-40).

It should be appreciated that the bed lift system 12 can include any number of configurations for the lower bed 640 when it is in the upright position. For example, the lower bed 640 can be a single unitary component that rotates to a vertical orientation adjacent to one of the walls 16, 18 in the upright position (FIGS. 36-38). In other words, the entire lower bed 640 rotates to a vertical, stowed position adjacent to one of the walls 16, 18.

Figure 5:
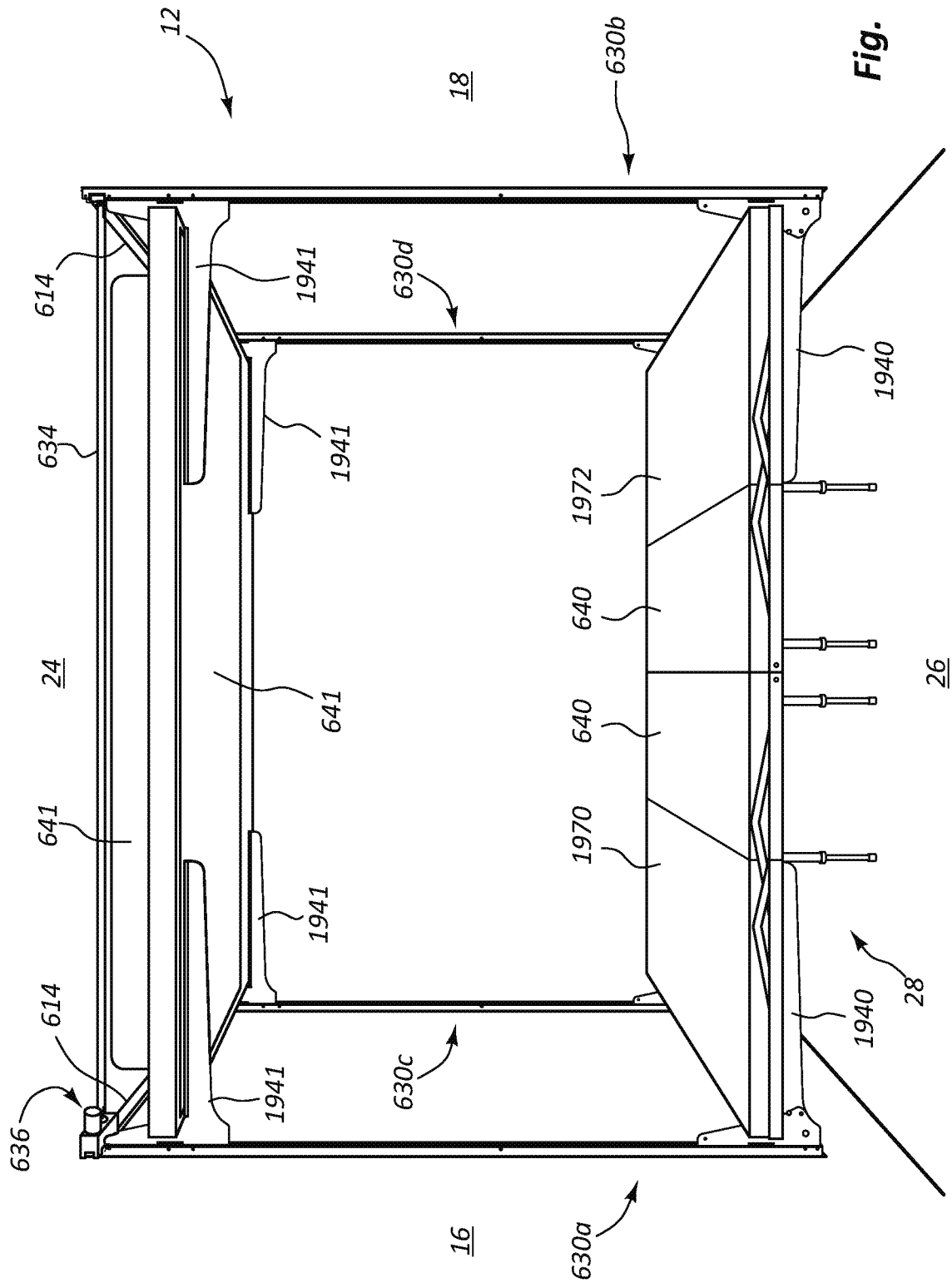
FIG. 5 is a perspective view of the interior of the toy hauler in FIG. 1 with the bunk beds in a partially stowed position where the lower bed is oriented horizontally and positioned to receive one or more persons to sleep thereon and the upper bed is oriented horizontally and stowed adjacent to the ceiling of the vehicle.

The beds 640, 641 can also move between the lowered position, the raised position, the upright position, and a partially stowed position where the lower bed 640 is oriented horizontally and positioned to receive one or more persons to sleep thereon and the upper bed 641 is oriented horizontally and stowed adjacent to the ceiling 24 of the vehicle 10 (FIG. 5). The partially stowed position can be useful in situations where the user wants to use the lower bed 640 but doesn't want to use the upper bed 641.

Figure 6:
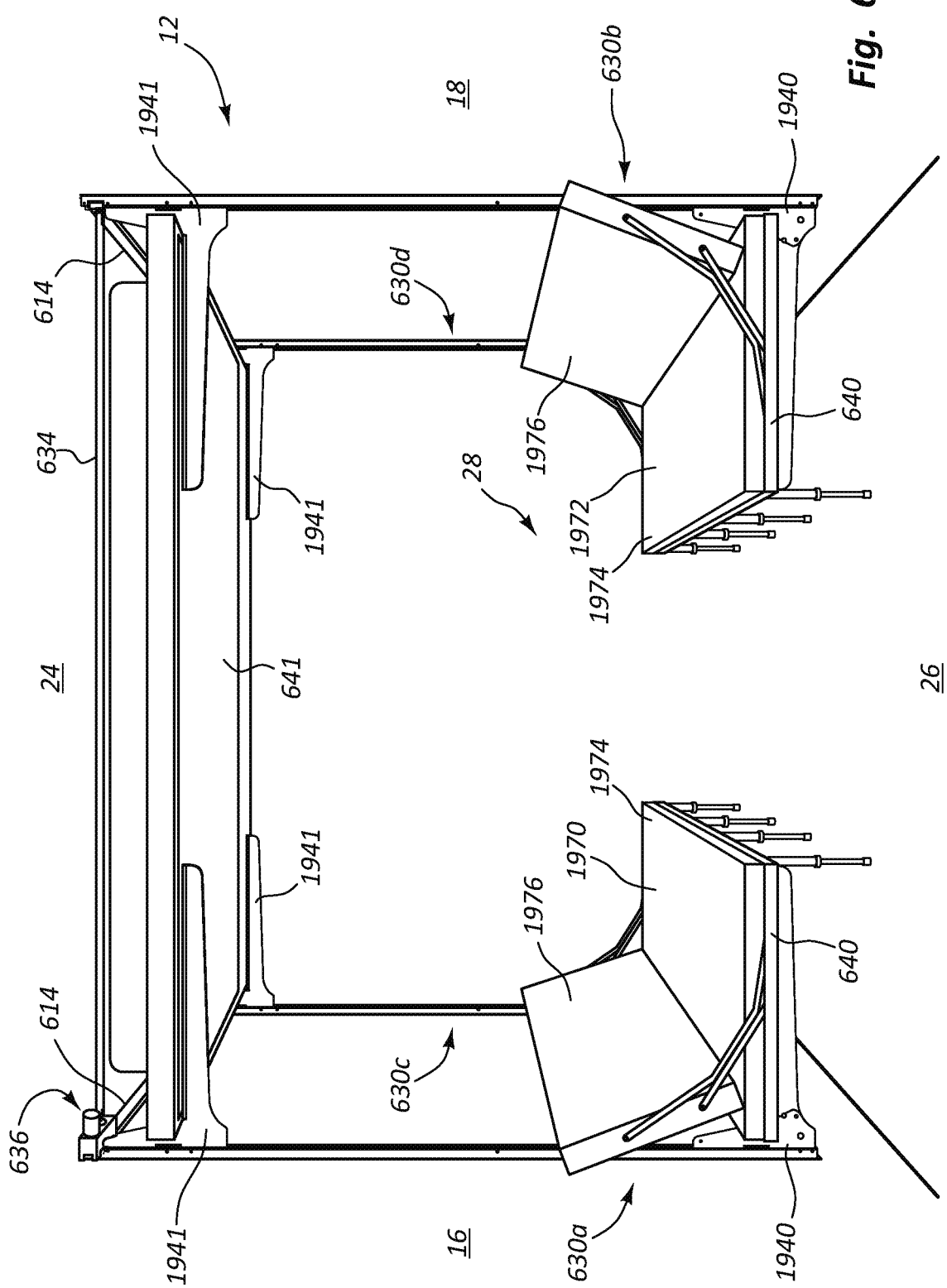
FIG. 6 is a perspective view of the interior of the toy hauler in FIG. 1 with the bunk beds in a partially stowed position where the lower bed forms two opposing seating units having a seat base and a seat back and the upper bed is oriented horizontally and stowed adjacent to the ceiling of the vehicle.

There may be situations when the user wants additional seating space inside the vehicle 10. This can be accomplished by configuring the lower bed 640 to move between a sleeping configuration where the bed 640 is at least substantially flat to receive one or more persons to sleep thereon and a seating configuration where the bed 640 includes a seat base 1974 and a seat back 1976 to receive one or more persons to sit thereon (FIG. 6).

In one embodiment, the lower bed 640 forms at least two seating units when the bed 640 is in the seating configuration. For example, the portions 1970, 1972 of the lower bed 640 can be roll-over sofas that each convert into a seating unit that extends adjacent to and parallel with the walls 16, 18, respectively, of the vehicle 10 (FIG. 6). In this configuration, the seating units face each other and are separated by an aisle that is parallel to the lengthwise direction of the vehicle 10.

The mounting member 1940 and moving member 1920 are shown in greater details in FIGS. 7-15. The mounting member 1940 is coupled to the lower bed 640 and makes it possible for it to move to the upright position. As mentioned above, the mounting member 1940 can move between a first position where the bed 640 is oriented horizontally and a second position where the bed 640 is oriented vertically, preferably adjacent to one or more of the walls 16, 18 of the vehicle 10.

FIGS. 7-10 show the mounting member 1940 with all of the fasteners in place. FIGS. 11-14 show the same views with the fasteners removed to better illustrate the structure and design of the mounting member 1940.

The mounting member 1940 includes a support arm or first support member 1942 movably coupled to a support base or second support member 1944. The support arm 1942 extends underneath and is coupled to the lower bed 640. The support base 1944 is coupled to the moving member 1920.

In one embodiment, the mounting member 1940 is coupled to the moving member 1920 in a readily releasable manner. The mounting member 1940 includes projections, tabs, or hooks 1943 that fit in corresponding openings or holes 1945 in the moving member 1920. The mounting member 1940 is coupled to the moving member 1920 by inserting the projections 1943 into the holes 1945 and moving the mounting member 1920 downward into a snug fit. The holes 1945 can be tapered in the manner shown in FIG. 15 to more securely receive the projections 1943. This configuration makes it easy to couple and decouple the mounting member 1940 from the moving member 1920.

The support arm 1942 is rotatably coupled to the support base 1944. This allows the support arm 1942 to move between a first position where the support arm 1942 extends horizontally from the support base 1944 and a second position where the support arm 1942 extends downwardly from the support base 1944.

The support arm 1942 is coupled to the support base 1944 by a fastener 1947, which extends through a slot or opening 1948 in the support arm 1942 and a corresponding hole or opening 1946 in the support base 1944. The support arm 1942 rotates on the axis of the fastener 1947 to move between the first position and the second position.

The support arm 1942 includes a projection, lug, or support element 1950 that engages a corresponding recess 1952 in the support base 1944 to hold mounting member 1940 in the first position. Gravity holds the projection 1950 in the recess 1952 to create an interlocking arrangement that prevents the support arm 1942 from rotating downward relative to the support base 1944. In one embodiment, the projection 1950 is a pin coupled to the support arm 1942 by welding or the like.

A fastener or locking member 1949 locks extends through corresponding holes 1954, 1956 in the support arm 1942 and the support base 1944, respectively, to lock the support arm 1942 and support base 1944 together. The support arm 1942 is unable to rotate relative to the support base 1944 when the fastener 1949 is in place.

The fastener 1949 can be any suitable fastener that is capable of extending through the holes 1954, 1956. Preferably, the fastener 1949 doesn't include threads thereby making it easier to fasten and release. In one embodiment, the fastener 1949 is a pin that extends through the holes 1954, 1956.

The support arm 1942 rotates from the first position to the second position in the manner shown in FIGS. 16-20. The first step is to remove the fastener 1949 from the holes 1954, 1956 so that the support arm 1942 is capable of moving upward relative to the support base 1944. The support arm 1942 cannot move downward because the projection 1950 is engaged with the recess 1952.

The support arm 1942 is rotated slightly upward to disengage the projection 1950 from the recess 1952. The support arm 1942 is then moved translationally in a longitudinal direction outward from the fastener 1947 until the projection 1950 clears the outer edge of the support base 1944. The slot 1948 makes it possible for the support arm 1942 to move a short distance translationally relative to the fastener 1947. The support arm 1942 is in the position shown in FIGS. 16-17.

The projection 1950 is beyond the outer edge of the support base 1944 and free to rotate in the manner shown in FIG. 18. The support arm 1942 pivots downward until it is roughly vertical as shown in FIGS. 19-20.

It should be noted that the support arm 1942 can be moved from the horizontal position to the vertical position without loosening or removing a threaded fastener such as a bolt or screw. This makes it possible for the user to move the bed 640 between a horizontal orientation and a vertical orientation without tools.

It should also be noted that the support arm 1942 moves through a predefined sequence of movements as it moves from the horizontal position to the vertical position. The support arm 1942 rotates upward, moves outward translationally, and rotates downward. The configuration of the support arm 1942 which allows the projection 1950 to engage the recess 1952 and remain in place by the force of gravity produces this type of movement.

Referring to FIGS. 19-20, the support arm 1942 can be locked in the vertical or stowed position by placing the fastener 1949 through the hole 1956 in the support base 1944. The support arm 1942 and the support base 1944 are shaped so that the support arm 1942 cannot pivot upward when the fastener 1949 is positioned in the hole 1956. In this manner, the same hole 1956 in the support base 1944 can be used to hold the support arm 1942 in the horizontal or vertical position.

FIGS. 21-24 show an embodiment where the lower bed 640 can be easily removed from the lifting assembly 630. In this embodiment, a bed support member or bed support bracket 1960 is coupled to the underside of the lower bed 640 and configured to receive the support arm 1942.

The bed support member 1960 is coupled to the underside of the lower bed 640 in the manner shown in FIG. 21. The bed support member 1960 includes a channel 1962 that is shaped to slidingly receive the support arm 1942. In the embodiment shown in the Figs., the support arm 1942 has an inverted L shape and the bed support member 1960 has an upright L shape. The two components slide together so that the horizontal portion of the Ls are adjacent to each other and prevent the lower bed 640 from coming off the support arm 1942.

The lower bed 640 is locked in place using a fastener or pin that extends through a hole 1964 at the distal end of the support arm 1942. The support arm 1942 extends slightly beyond the end of the bed support member 1960 so that the fastener or pin can extend through the hole 1964. The fastener holds the lower bed 640 to the support arm 1942 when the bed 640 is in the upright position.

The bed 640 can be removed from the mounting member 1940 by removing the fastener or pin from the hole 1964 and sliding the bed 640 off the support arm 1942. The support arm 1942 can then be pivoted downward or removed from the moving member 1920.

It should be appreciated that the upper bed 641 can be coupled to the lifting assemblies 630 in a similar manner. For example, the upper bed 641 can be held in place by a fastener that extends through the hole 1964 at the distal end of the support arm 1942.

FIGS. 26-27 show another embodiment of the mounting member 1941. This embodiment is the same as the mounting member 1940 except the support arm and the support base do not rotate relative to each other. They are fixed in a stationary position relative to each other.

It should be appreciated that although FIGS. 1-6 show the lower bed 640 support by the mounting members 1940 and the upper bed 641 supported by mounting members 1941, any combination of the mounting members 1940, 1941 can be used. For example, the lower bed 640 can be supported by the mounting members 1941, or the upper bed 641 can be supported by the mounting members 1940.

FIGS. 27-35 show another embodiment of the mounting member 1840 and the moving member 1620. In this embodiment, the mounting member 1840 is vertically offset or dog-legged to allow the bed 640 to be lowered to a suitable height for a user to sit on but still have the guide member 618 be far enough off the floor to not interfere with the wheels of off-road vehicles and the like (FIGS. 27-30). In one embodiment, the guide member 618 is at least 12 inches from the floor, at least 15 inches from the floor, at least 17 inches from the floor, or at least 18 inches from the floor.

In one embodiment, the top surface of the bed 640 is at least 15 inches from the floor, at least 18 inches from the floor, or at least 20 inches from the floor when the bed 640 is in the lowered or use position. In the same embodiment, the top surface of the bed 640 is no more than 24 inches from the floor or no more than 29 inches from the floor when the bed 640 is in the lowered position.

The mounting member 1840 can be coupled to the moving member 1620 in an easily releasable manner as described above. However, in this embodiment, only the upper portion of the mounting member 1840 is configured to be coupled to the moving member 1620. Also, the length of the moving member 1620 has been reduced relative to the moving member 1920.

The mounting member 1840 is especially suitable for use with the configurations of the bed 640 shown in FIGS. 136 and 256-260 of the '545 patent. In both situations, the mounting member 1840 is capable of holding the weight of the lower bed 640 so it is unnecessary to use the support legs 588, 1528 to support the beds 640 in the seating configuration. It should be appreciated, however, that support legs can be used to support the lower bed 640 in the lowered position.

The mounting member 1840 includes a main bracket 1846 coupled to a support bracket 1842. Each side of the support bracket 1842 is coupled to a wheel 1844. The wheels 1844 ride on a guide track 1660 coupled to the walls 16, 18 of the vehicle 10. The wheels 1844 provide the required support to prevent the mounting member 1840 from sagging when multiple users sit on the lower bed 640 when it is in the seating configuration shown in FIG. 30.

The guide track 1660 can be any suitable material such as steel or the like. The guide track 1660 prevents the walls 16, 18 from being damaged by the repeated motion of the wheels 1844 as the bed 640 is raised and lowered. In one embodiment, the guide track 1660 is provided as an integral part of the lifting assembly 630. For example, the guide track 1660 can be coupled to the rear side of the guide member 618.

Referring to FIG. 32, the mounting member 1840 supports the lower bed 640 at location 1693, which is the top of the support arm portion of the main bracket 1846. The mounting member 1840 is coupled to the moving member 1620 with the lowest point being at location 1691. It should be noted that the lowest point where the mounting member 1840 is coupled to the moving member 1620 refers to a point of attachment not merely contact.

As shown in FIG. 32, the location 1693 where the mounting member 1840 supports the lower bed 640 is below the location 1691, which is the lowest point where the mounting member 1840 is coupled to the moving member 1620, and below the bottom of the guide member 618.

It should be appreciated the various mounting mechanisms and mounting members disclosed herein can be combined in various ways to create additional configurations. For example, the mounting member 1940 can be vertically offset using wheels or rollers as disclosed in FIGS. 27-35. Any combination of the enclosed subject matter is contemplated.

ILLUSTRATIVE EMBODIMENTS

Reference is made in the following to a number of illustrative embodiments of the disclosed subject matter. The following embodiments illustrate only a few selected embodiments that may include one or more of the various features, characteristics, and advantages of the disclosed subject matter. Accordingly, the following embodiments should not be considered as being comprehensive of all of the possible embodiments.

It should also be appreciated that some components, features, and/or configurations may be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement.

In one embodiment a vehicle comprises: a bed that moves between a lowered position where the bed is oriented horizontally and positioned to receive one or more persons to sleep thereon, a raised position where the bed is oriented horizontally and stowed adjacent to a ceiling of the vehicle, and an upright position where at least a portion of the bed is oriented vertically and stowed adjacent to a wall of the vehicle.

The bed can move vertically and at least substantially translationally between the lowered position and the raised position. The bed can rotate between the upright position and at least one of the lowered position or the raised position. The bed can rotate downward from the raised position to the upright position, or the bed can rotate upward from the lowered position to the upright position.

The bed can move between a sleeping configuration where the bed is at least substantially flat to receive one or more persons to sleep thereon and a seating configuration where the bed includes a seat base and a seat back to receive one or more persons to sit thereon. The bed can form at least two seating units in the seating configuration where each seating unit includes a seat base and a seat back. The at least two seating units can face each other and be separated by an aisle.

When the bed is in the upright position, a first portion of the bed can be oriented vertically and stowed adjacent to a first wall of the vehicle and a second portion of the bed can be oriented vertically and stowed adjacent to a second wall of the vehicle. The first wall and the second wall of the vehicle can be positioned opposite each other. The first portion of the bed can form one of the at least two seating units and the second portion of the bed can form another one of the at least two seating units. The entire bed can also be oriented vertically and stowed adjacent to one wall of the vehicle when the bed is in the upright position.

The bed can be a first bed and the vehicle can include a second bed positioned above the first bed. The second bed can move between a lowered position where the second bed is positioned to receive one or more persons to sleep thereon and a raised position where the second bed is stowed adjacent to a ceiling of the vehicle.

The vehicle can comprise a lifting assembly that moves the bed between the lowered position and the raised position. The lifting assembly includes a mounting member supporting the bed. The mounting member moves between a first position where the bed is oriented horizontally and a second position where the bed is oriented vertically.

In another embodiment, a bed lift system is configured to be coupled to a vehicle and move a bed inside the vehicle between a lowered position where the bed is oriented horizontally and positioned to receive one or more persons to sleep thereon, a raised position where the bed is oriented horizontally and stowed adjacent to a ceiling of the vehicle, and an upright position where at least a portion of the bed is oriented vertically and stowed adjacent to a wall of the vehicle.

The bed lift system can comprise a mounting member configured to support the bed. The mounting member can be configured to rotate between a first position where the bed is oriented horizontally and a second position where the bed is oriented vertically.

In another embodiment, a bed lift system comprises a first guide member configured to be coupled to the vehicle in a vertical orientation; a second guide member configured to be coupled to the vehicle in a vertical orientation; a first moving member coupled to the first guide member in a manner that allows the first moving member to move vertically relative to the first guide member; a second moving member coupled to the second guide member in a manner that allows the second moving member to move vertically relative to the second guide member; a first mounting member coupled to the first moving member, the first mounting member being configured to be coupled to a bed; and a second mounting member coupled to the second moving member, the second mounting member being configured to be coupled to the bed; wherein the first mounting member and the second mounting member each move between a first position where the first mounting member or the second mounting member is configured to support the bed in a horizontal orientation and a second position where the first mounting member or the second mounting member is configured to support the bed in a vertical orientation.

In another embodiment, a mounting member for coupling a bed to a bed lift system comprises: a support base configured to be coupled to the bed lift system; and a support arm rotatably coupled to the support base, the support arm being configured to be coupled to the bed; wherein the mounting member moves between a first position where the support arm extends horizontally from the support base and a second position where the support arm extends downwardly from the support base.

The mounting member can be held in the first position by gravity. The mounting member can be locked in the first position with a fastener. In one embodiment, the fastener does not include threads. The mounting member can be locked in the second position with a fastener. The mounting member can be locked in the first position and/or the second position with a fastener. The fastener can extend through a hole in the support base to hold the mounting member in the first position and extend through the same hole in the support base to hold the mounting member in the second position.

The support arm and the support base can include interlocking support components that hold the mounting member in the first position. The interlocking support components can include a projection and a corresponding recess configured to receive and support the projection.

The mounting member can move from the first position to the second position without the user loosening or removing a threaded fastener. The support arm can move rotationally and translationally as the mounting member moves between the first position and the second position.

The support arm can move through a predefined sequence of rotational and translational movements as the mounting member moves between the first position and the second position. The predefined sequence of movements includes moving the support arm rotationally, moving the support arm translationally, and moving the support arm rotationally.

The mounting member can be held in the first position by a projection on the support arm that engages a recess in the support base. The mounting member can move from the first position to the second position by rotating the support arm until the projection is disengaged from the recess, translating the support arm until the projection is beyond the support base, and rotating the support arm until the mounting member is in the second position.

In another embodiment, a vehicle comprises a bed that moves between a lowered position where the bed is positioned to receive one or more persons to sleep thereon and a raised position where the bed is stowed adjacent to a ceiling of the vehicle; a lifting assembly that moves the bed between the lowered position and the raised position, the lifting assembly comprising a guide member coupled to the vehicle in a vertical orientation; a moving member coupled to the guide member in a manner that allows the moving member to move vertically relative to the guide member; and a mounting member coupled to the moving member and the bed. The mounting member supports the bed at a location that is (a) below the lowest point where the mounting member is coupled to the moving member or (b) below the bottom of the guide member.

In another embodiment, a bed lift system comprises: a guide member configured to be coupled inside a vehicle in a vertical orientation; a moving member coupled to the guide member in a manner that allows the moving member to move vertically relative to the guide member; and a mounting member coupled to the moving member, the mounting member being configured to support a bed at a location that is (a) below the lowest point where the mounting member is coupled to the moving member or (b) below the bottom of the guide member.

In another embodiment, a mounting member for coupling a bed to a bed lift system is configured to support the bed at a location on the mounting member that is below the lowest point where the mounting member is coupled to the bed lift system.

In another embodiment, a vehicle comprises: a bed that moves between a lowered position where the bed is positioned to receive one or more persons to sleep thereon and a raised position where the bed is stowed adjacent to a ceiling of the vehicle; and a lifting assembly coupled to a wall of the vehicle and configured to move the bed between the lowered position and the raised position, the lifting assembly including a mounting member coupled to the bed that moves vertically with the bed as the bed moves between the lowered position and the raised position; wherein the mounting member contacts and is supported by the wall of the vehicle adjacent to the lifting assembly.

The mounting member can be coupled to the lifting assembly at a location above the location where the mounting member contacts and is supported by the wall of the vehicle. The mounting member can include at least one wheel that contacts the wall of the vehicle adjacent to the lifting assembly. The mounting member can contact a guide track on the wall of the vehicle.

In another embodiment, the lifting assembly comprises a guide member coupled to the wall of the vehicle; and a moving member coupled to the guide member in a manner that allows the moving member to move vertically relative to the guide member; wherein the mounting member contacts and is supported by the wall of the vehicle at a location below the bottom of the guide member when the bed is in the lowered position.

In another embodiment, a bed lift system comprises a lifting assembly configured to be coupled to a wall of the vehicle and move a bed between a lowered position where the bed is positioned to receive one or more persons to sleep thereon and a raised position where the bed is stowed adjacent to a ceiling of the vehicle, the lifting assembly including a mounting member configured to be coupled to the bed and move vertically with the bed as the bed moves between the lowered position and the raised position; wherein the mounting member is configured to contact and be supported by the wall of the vehicle adjacent to the lifting assembly.

The mounting member can be coupled to the lifting assembly at a location above the location where the mounting member is configured to contact and be supported by the wall of the vehicle. The mounting member can include at least one wheel configured to contact the wall of the vehicle adjacent to the lifting assembly.

The lifting assembly can comprise: a guide member configured to be coupled to the wall of the vehicle; and a moving member coupled to the guide member in a manner that allows the moving member to move vertically relative to the guide member; wherein the mounting member is configured to contact and be supported by the wall of the vehicle at a location below the bottom of the guide member when the bed is in the lowered position.

In another embodiment, a mounting member for coupling a bed to a bed lift system includes an upper portion where the mounting member is configured to be coupled to the bed lift system and a lower portion where the mounting member is configured to contact and be supported by a wall adjacent to the bed lift system. The lower portion of the mounting member includes at least one wheel configured to contact the wall adjacent to the bed lift system.

In another embodiment, a bed lift system comprises a guide member configured to be coupled inside a vehicle in a vertical orientation; a moving member coupled to the guide member in a manner that allows the moving member to move vertically relative to the guide member; and a mounting member coupled to the moving member in a readily releasable manner. The mounting member can include protections received by corresponding openings in the moving member.

Additional Considerations

It should be noted that for purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

The term "coupled" also refers to joining that is permanent in nature or releasable and/or removable in nature. Permanent joining refers to joining the components together in a manner that is not capable of being reversed or returned to the original condition. Releasable joining refers to joining the components together in a manner that is capable of being reversed or returned to the original condition.

Releasable joining can be further categorized based on the difficulty of releasing the components and/or whether the components are released as part of their ordinary operation and/or use. Readily or easily releasable joining refers to joining that can be readily, easily, and/or promptly released with little or no difficulty or effort. Difficult or hard to release joining refers to joining that is difficult, hard, or arduous to release and/or requires substantial effort to release. The joining can be released or intended to be released as part of the ordinary operation and/or use of the components or only in extraordinary situations and/or circumstances. In the latter case, the joining can be intended to remain joined for a long, indefinite period until the extraordinary circumstances arise.

It should be appreciated that the components can be joined together using any type of fastening method and/or fastener. The fastening method refers to the manner in which the components are joined. A fastener is generally a separate component used in a mechanical fastening method to mechanically join the components together. A list of examples of fastening methods and/or fasteners are given below. The list is divided according to whether the fastening method and/or fastener is generally permanent, readily released, or difficult to release.

Examples of permanent fastening methods include welding, soldering, brazing, crimping, riveting, stapling, stitching, some types of nailing, some types of adhering, and some types of cementing. Examples of permanent fasteners include some types of nails, some types of dowel pins, most types of rivets, most types of staples, stitches, most types of structural ties, and toggle bolts.

Examples of readily releasable fastening methods include clamping, pinning, clipping, latching, clasping, buttoning, zipping, buckling, and tying. Examples of readily releasable fasteners include snap fasteners, retainer rings, circlips, split pin, linchpins, R-pins, clevis fasteners, cotter pins, latches, hook and loop fasteners (VELCRO), hook and eye fasteners, push pins, clips, clasps, clamps, zip ties, zippers, buttons, buckles, split pin fasteners, interlocking tabs, tab and hole connectors, and/or conformat fasteners.

Examples of difficult to release fastening methods include bolting, screwing, most types of threaded fastening, and some types of nailing. Examples of difficult to release fasteners include bolts, screws, most types of threaded fasteners, some types of nails, some types of dowel pins, a few types of rivets, a few types of structural ties.

It should be appreciated that the fastening methods and fasteners are categorized above based on their most common configurations and/or applications. The fastening methods and fasteners can fall into other categories or multiple categories depending on the specific configuration and/or application. For example, rope, string, wire, cable, chain, and the like can be permanent, readily releasable, or difficult to release depending on the application.

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure the term shall mean," etc.).

References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope.

The subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be given their broadest interpretation in view of the prior art and the meaning of the claim terms.

As used herein, spatial or directional terms, such as "left," "right," "front," "back," and the like, relate to the subject matter as it is shown in the drawings. However, it is to be understood that the described subject matter may assume various alternative orientations and, accordingly, such terms are not to be considered as limiting.

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

All disclosed ranges are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

All disclosed numerical values are to be understood as being variable from 0-100% in either direction and thus provide support for claims that recite such values or any and all ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range (e.g., 15.2).

INCORPORATION BY REFERENCE

The entire contents of each of the documents listed below are incorporated by reference into this document. If the same term is used in both this document and one or more of the incorporated documents, then it should be interpreted to have the broadest meaning imparted by any one or combination of these sources unless the term has been explicitly defined to have a different meaning in this document. If there is an inconsistency between any of the following documents and this document, then this document shall govern. The incorporated subject matter should not be used to limit or narrow the scope of the explicitly recited or depicted subject matter.

U.S. Pat. No. 10,703,250 (application Ser. No. 15/601,418), titled "Bed Lift Mounting Member," issued on 7 Jul. 2020.

U.S. Pat. No. 9,656,590 (application Ser. No. 14/714,215), titled "Bed Lift Mounting Member," issued on 23 May 2017.

U.S. Prov. App. No. 62/069,804, titled "Bed Mounting Member for a Bed Lift," filed on 28 Oct. 2014.

U.S. Prov. App. No. 61/993,962, titled "Bed Mounting Member for a Bed Lift," filed on 15 May 2014.

U.S. Pat. No. 8,651,545 (application Ser. No. 13/685,471), titled "Bed Lift," issued on 18 Feb. 2014. This patent contains a description of a number of the components and features shown in the attached drawings. Moreover, it should be appreciated that the novel features disclosed in this document can be used with any of the subject matter disclosed in this patent.

The invention claimed is:

1. A structure comprising:
a guide member coupled to a wall of the structure, the guide member being oriented vertically in the structure;
a carriage member coupled to the guide member, the carriage member sliding vertically relative to the guide member;
a mounting bracket coupled to the carriage member, the mounting bracket comprising a support base and a support arm; and
a bed coupled to the mounting bracket;
wherein the mounting bracket is coupled to the carriage member in a readily releasable manner; and
wherein the support arm rotates relative to the support base.

2. The structure of claim 1 wherein the bed is movable between a lowered position where the bed is oriented horizontally and positioned to receive one or more persons to sleep thereon, a raised position where the bed is oriented horizontally and stowed, and an upright position where the bed is oriented vertically and stowed adjacent to the wall.

3. The structure of claim 1 wherein the bed is movable between a sleeping configuration where the bed is at least substantially flat to receive one or more persons to sleep thereon and a seating configuration where the bed includes a seat base and a seat back to receive one or more persons to sit thereon.

4. The structure of claim 1 wherein the mounting bracket is coupled to the carriage member with projections on one of the mounting bracket or the carriage member received by openings in the other one of the mounting bracket or the carriage member, and wherein the projections and the openings slidingly engage each other to securely hold the mounting bracket and the carriage member together.

5. The structure of claim 4 wherein the projections are on the mounting bracket and the openings are in the carriage member.

6. The structure of claim 1 wherein the support base is coupled to the bed.

7. A bed lift system comprising:
a guide member configured to be coupled inside a vehicle in a vertical orientation;
a carriage member coupled to the guide member, the carriage member being movable vertically relative to the guide member; and
a mounting bracket configured to be coupled to the carriage member in a readily releasable manner, the mounting bracket being configured to be coupled to a bed;
wherein the mounting bracket comprises a support base and a support arm, and
wherein the support arm rotates relative to the support base.

8. The bed lift system of claim 7 wherein the mounting bracket is configured to be coupled to the carriage member with projections on one of the mounting bracket or the carriage member received by openings in the other one of the mounting bracket or the carriage member, and wherein the projections and the openings slidingly engage each other to securely hold the mounting bracket and the carriage member together.

9. The bed lift system of claim 7 wherein the support base is configured to be coupled to the bed.

10. A structure comprising:
a guide member coupled to a wall of the structure, the guide member being oriented vertically in the structure;
a carriage member coupled to the guide member, the carriage member sliding vertically relative to the guide member;
a mounting bracket coupled to the carriage member; and
a bed coupled to the mounting bracket, the bed including a bed support member;
wherein the mounting bracket is slidably received by the bed support member.

11. The structure of claim 10 wherein the bed is movable between a lowered position where the bed is oriented horizontally and positioned to receive one or more persons to sleep thereon, a raised position where the bed is oriented horizontally and stowed, and an upright position where the bed is oriented vertically and stowed adjacent to the wall.

12. The structure of claim 10 wherein the bed is movable between a sleeping configuration where the bed is at least substantially flat to receive one or more persons to sleep thereon and a seating configuration where the bed includes a seat base and a seat back to receive one or more persons to sit thereon.

13. The structure of claim 10 wherein the mounting bracket is slidably received by a channel in the bed support member.

14. The structure of claim 10 wherein the mounting bracket comprises a support base and a support arm, and wherein the support base is coupled to the carriage member and the support arm is slidably received by the bed support member.

15. The structure of claim 14 wherein the support arm has an L shape and the bed support member has a corresponding L shape.

16. The structure of claim 14 wherein the support arm rotates relative to the support base.

17. The structure of claim 10 wherein the mounting bracket is fastened to the bed support member with a readily releasable fastener.

18. A bed lift system comprising:
a guide member configured to be coupled inside a vehicle in a vertical orientation;
a carriage member coupled to the guide member, the carriage member being movable vertically relative to the guide member; and
a mounting bracket configured to be coupled to the carriage member, the mounting bracket also being configured to be coupled to a bed;

wherein the mounting bracket is configured to be slidably received by a bed support member coupled to the bed.

19. The bed lift system of claim 18 wherein the bed support member includes a channel configured to slidably receive the mounting bracket.

20. The bed lift system of claim 18 wherein the mounting bracket comprises a support base and a support arm, and wherein the support arm is configured to be slidably received by the bed support member.

\* \* \* \* \*